US012726961B2

(12) United States Patent
Sha et al.

(10) Patent No.: US 12,726,961 B2
(45) Date of Patent: Sep. 1, 2026

(54) COMMUNICATION METHOD AND APPARATUS

(71) Applicant: Huawei Technologies Co., Ltd., Shenzhen (CN)

(72) Inventors: Tong Sha, Beijing (CN); Junren Chang, Beijing (CN); Jianlin Wang, Beijing (CN); Jianghua Liu, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 18/489,520

(22) Filed: Oct. 18, 2023

(65) Prior Publication Data

US 2024/0049204 A1 Feb. 8, 2024

Related U.S. Application Data

(63) Continuation of application No. PCT/CN2022/086438, filed on Apr. 12, 2022.

(30) Foreign Application Priority Data

Apr. 20, 2021 (CN) ......................... 202110425818.8

(51) Int. Cl.
*H04W 72/0453* (2023.01)

(52) U.S. Cl.
CPC ............................... *H04W 72/0453* (2013.01)

(58) Field of Classification Search
CPC ............. H04W 72/0453; H04W 72/23; H04W 52/0206; H04W 52/0216; H04W 52/0235;
(Continued)

(56) References Cited

U.S. PATENT DOCUMENTS

2013/0331077 A1* 12/2013 Mucke .................. H04W 76/34
455/418
2019/0342843 A1* 11/2019 Raghavan ............ H04L 1/0009
(Continued)

FOREIGN PATENT DOCUMENTS

CN 104365038 A 2/2015
CN 105589506 A 5/2016
(Continued)

OTHER PUBLICATIONS

3GPP TS 38.101-1 V15.13.0 (Mar. 2021), 3rd Generation Partnership Project; Technical Specification Group Radio Access Network; NR; User Equipment (UE) radio transmission and reception; Part 1: Range 1 Standalone (Release 15), total 241 pages.
(Continued)

*Primary Examiner* — Yu-Wen Chang
(74) *Attorney, Agent, or Firm* — Slater Matsil, LLP

(57) ABSTRACT

This application provides a communication method and apparatus. The method includes: A terminal device receives configuration information from a network device, where the configuration information is used to configure a first carrier or a first carrier group. The terminal device may send first information to the network device, where the first information is used to request to suppress activation of the first carrier or the first carrier group.

20 Claims, 6 Drawing Sheets

(58) Field of Classification Search
CPC ......... H04W 52/0245; H04W 52/0248; H04W 52/028; H04W 76/28; H04L 5/001; H04L 5/0098
See application file for complete search history.

(56) References Cited

U.S. PATENT DOCUMENTS

| | | | | |
|---|---|---|---|---|
| 2020/0084011 | A1* | 3/2020 | Li | H04L 5/0098 |
| 2020/0351638 | A1* | 11/2020 | Kim | H04W 8/22 |
| 2022/0132333 | A1* | 4/2022 | Mattam | H04W 24/02 |
| 2022/0312417 | A1* | 9/2022 | Venkata | H04W 76/27 |
| 2022/0337360 | A1* | 10/2022 | Lee | H04L 5/001 |
| 2024/0196195 | A1* | 6/2024 | Shrivastava | H04W 72/21 |
| 2024/0196477 | A1* | 6/2024 | Sunell | H04W 76/34 |

FOREIGN PATENT DOCUMENTS

| | | | |
|---|---|---|---|
| CN | 106604296 | A | 4/2017 |
| CN | 104067533 | B | 11/2017 |
| JP | 2015512184 | A | 4/2015 |
| WO | 2013112848 | A3 | 8/2013 |

OTHER PUBLICATIONS

3GPP TS 38.101-2 V17.1.0 (Mar. 2021), 3rd Generation Partnership Project; Technical Specification Group Radio Access Network; NR; User Equipment (UE) radio transmission and reception; Part 2: Range 2 Standalone (Release 17), total 189 pages.

3GPP TSG RAN WG3 #110-e, R3-205990, "Discussion on SCG deactivation and activation", ZTE, Nov. 2-12, 2020, total 8 pages.

3GPP TSG RAN WG2 #107, R2-1909867, "UE Assistance Information for SCell Activation and Deactivation", Apple, Aug. 26-30, 2019, total 4 pages.

Intel Corporation: "Report on [105bis#28] [NR/Power Savings] UE assistance", 3GPP TSG RAN WG2 Meeting #106; R2-1906426_PWS_EMAILDISC-28_UE-ASSISTANCE, 3rd Generation Partnership Project (3GPP), Mobile Competence Centre; 650, Route Des Lucioles; F-06921 Sophia-Antipolis Cedex; France, vol. RAN WG2, no. Reno, Nevada, USA; May 13, 2019-May 17, 2019, May 13-17, 2019 (May 13, 2019), XP051729891, total 24 pages.

Ericsson: "UE Assistance Information for UE preferred SCell configuration", 3GPP TSG-RAN2 Meeting #107, R2-1909991 UE Assistance Information for UE Preferred Scell Configuration, 3rd Generation Partnership Project (3GPP), Mobile Competence Centre; 650, Route Des Lucioles; F-06921 Sophia-An, vol. RAN WG2, no. Prague, Czech Republic; Aug. 26, 2019-Aug. 30, 2019, Aug. 26-30, 2019 (Aug. 16, 2019), XP051767777, total 5 pages.

Ericsson: "SCG deactivation procedures", 3GPP Draft: R2-2103807, 3rd Generation Partnership Project (3GPP), Mobile Competence Centre; 650, Route Des Lucioles; F-06921 Sophia-Antipolis Cedex; France vol. RAN WG2, no. Electronic meeting; Apr. 12, 2021-Apr. 20, 2021, Apr. 12-20, 2021 (Apr. 1, 2021), XP051992270, total 10 pages.

* cited by examiner

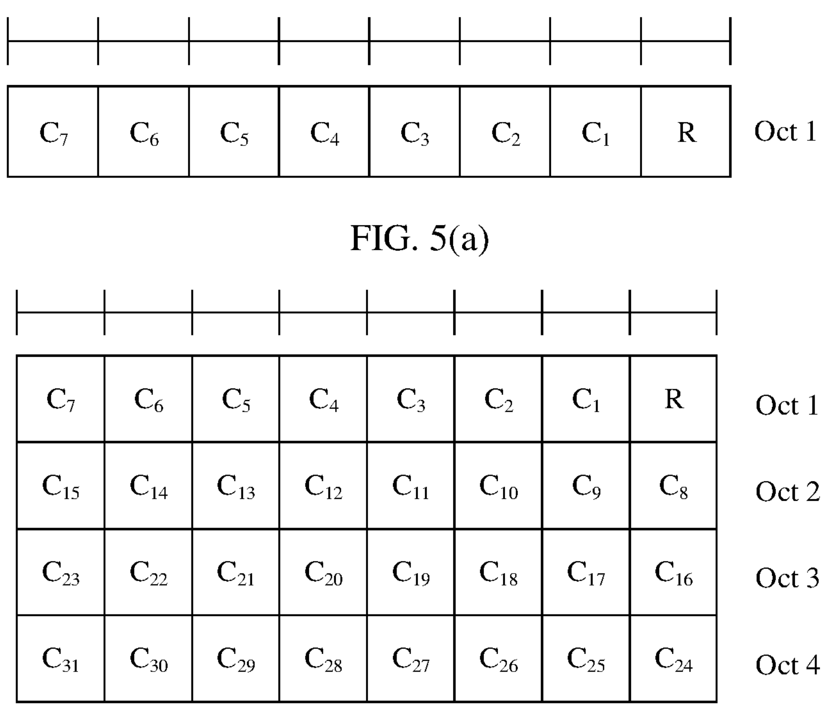
FIG. 5(a)
FIG. 5(b)
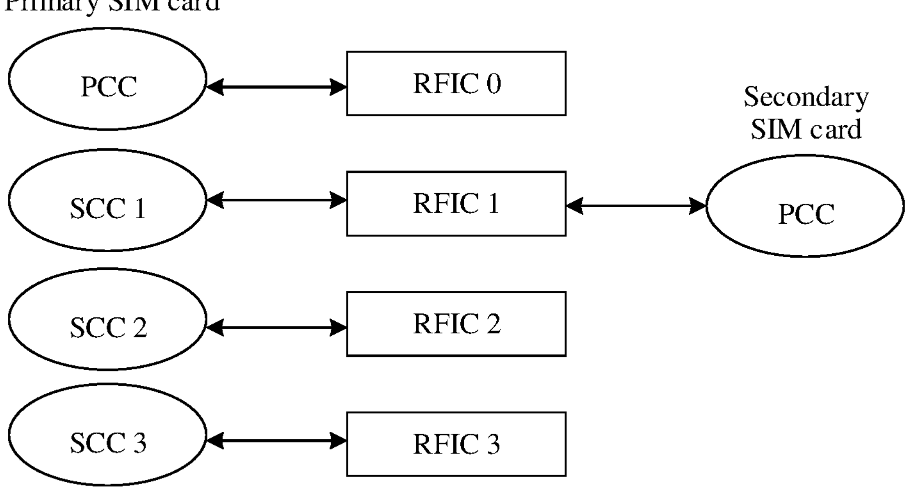
FIG. 6

COMMUNICATION METHOD AND APPARATUS

CROSS-REFERENCE TO RELATED APPLICATIONS

This application is a continuation of International Application No. PCT/CN2022/086438, filed on Apr. 12, 2022, which claims priority to Chinese Patent Application No. 202110425818.8, filed on Apr. 20, 2021. The disclosures of the aforementioned applications are hereby incorporated by reference in their entireties.

TECHNICAL FIELD

This application relates to the field of communication technologies, and in particular, to a communication method and apparatus.

BACKGROUND

In communication systems such as a long term evolution (LTE) system and a new radio (NR) system, a plurality of carriers may be aggregated for use by using a carrier aggregation (CA) technology, thereby increasing a bandwidth. In the CA technology, a carrier corresponding to a primary cell (PCell) is referred to as a primary carrier component (PCC). A carrier corresponding to a secondary cell (SCell) is referred to as a secondary carrier component (SCC). A network device configures a corresponding quantity of secondary carriers for a terminal device based on a capability reported by the terminal device.

The carriers configured by the network device based on the capability of the terminal device may not be suitable for the terminal device. For example, when the network device configures two carriers, for some reason, the terminal device can transmit data only on one carrier, but cannot transmit the data on the other carrier. When the network device simultaneously schedules the data on the two carriers, the terminal device can receive the data only on one carrier, and a large quantity of bit errors are generated during reception on the other carrier, which severely wastes system resources and affects user experience.

SUMMARY

This application provides a communication method and apparatus, to improve resource utilization.

According to a first aspect, this application provides a communication method. The method is performed by a terminal device, or a chip or module in the terminal device. An example in which the method is performed by the terminal device is used for description herein. The method includes: The terminal device receives configuration information from a network device. The terminal device sends first information to the network device. The configuration information is used to configure a first carrier or a first carrier group, and the first information is used to request to suppress activation of the first carrier or the first carrier group. Alternatively, the configuration information is used to configure a first cell or a first cell group, and the first information is used to request to suppress activation of the first cell or the first cell group.

According to the foregoing method, from a perspective of the terminal device, the terminal device can determine that a carrier in a specific band is associated with a specific radio frequency channel. If a hardware conflict occurs on the first carrier or the first carrier group configured by the network device on the terminal device side, the network activates the improper carrier or carrier group. As a result, data is scheduled on the conflicting carrier, and a large quantity of bit errors occur. In this application, the terminal device may actively request to suppress activation of the first carrier or the first carrier group, to avoid cases such as a case in which the bit errors occur in the data scheduled on the carrier due to reasons such as the hardware conflict, thereby improving resource utilization.

In a possible implementation, the suppressing activation of the first carrier or the first carrier group includes: when the first carrier or the first carrier group is activated, the first information is used to request to deactivate the first carrier or the first carrier group; and/or when the first carrier or the first carrier group is deactivated, the first information is used to request to keep a deactivated state of the first carrier or the first carrier group or is used to request not to activate the first carrier or the first carrier group.

According to the foregoing method, the first carrier or the first carrier group is deactivated, and/or the deactivated state of the first carrier or the first carrier group is kept, so that the network device does not schedule the data on the first carrier or the first carrier group. Therefore, that the bit errors occur in the data scheduled on the first carrier or the first carrier group due to the reasons such as the hardware conflict is avoided.

In a possible implementation, the suppressing activation of the first cell or the first cell group includes: when the first cell or the first cell group is activated, the first information is used to request to deactivate the first cell or the first cell group; and/or when the first cell or the first cell group is deactivated, the first information is used to request to keep a deactivated state of the first cell or the first cell group or is used to request not to activate the first cell or the first cell group.

In a possible implementation, the method further includes: suppressing activation of the first carrier or the first carrier group if first response information from the network device is received; or suppressing activation of the first carrier or the first carrier group or suppressing activation of the first cell or the first cell group if first response information from the network device is not received within first duration after the first information is sent.

The network device may use the first response information to ensure that the terminal device and the network device have consistent behavior of suppressing activation of the first carrier or the first carrier group, to avoid an error in scheduling on the first carrier or the first carrier group, thereby improving system efficiency.

In a possible implementation, the suppressing activation of the first carrier or the first carrier group if first response information from the network device is not received within first duration after the first information is sent includes: starting a timer when the first information is sent, where timing duration of the timer is the first duration; stopping the timer when the first response information from the network device is received; and when the timer expires, suppressing activation of the first carrier or the first carrier group if the first response information is not received.

In a possible implementation, the first response information further indicates at least one of the following: indicating a valid time for suppressing activation of the first carrier or the first carrier group or the first cell or the first cell group; and indicating that a state in which activation of the first carrier or the first carrier group or the first cell or the first cell group is suppressed is valid in a current radio resource control connection to the network device.

Activation of the first carrier or the first carrier group or the first cell or the first cell group is suppressed for a long time by indicating the valid time or indicating that the state is valid in the radio resource control connection, thereby improving system flexibility.

In a possible implementation, the method further includes: sending second information to the network device, where the second information indicates a maximum quantity of activated carriers expected by the terminal device, and the maximum quantity of activated carriers is less than or equal to a quantity of configured carriers supported by the terminal device.

The second information is used to limit a quantity of cells that can be simultaneously activated on a network side, to ensure that cell data activated by the network does not exceed a baseband capability (namely, the maximum quantity of activated carriers) of the terminal device. This reduces a probability of occurrence of a hardware conflict caused by carrier occupation to some extent, and avoids excessively high network scheduling complexity caused by the terminal device frequently requesting carrier deactivation when hardware conflicts frequently occur.

In a possible implementation, the method further includes: sending second information to the network device, where the second information indicates a maximum quantity of activated cells expected by the terminal device, and the maximum quantity of activated cells is less than or equal to a quantity of configured cells supported by the terminal device.

The second information is used to limit a quantity of cells that can be simultaneously activated on a network side, to ensure that the quantity of cells activated by the network does not exceed a baseband capability of the terminal device. This reduces a probability of occurrence of a hardware conflict caused by cell occupation to some extent, and avoids excessively high network scheduling complexity caused by the terminal device frequently requesting cell deactivation when hardware conflicts frequently occur.

In a possible implementation, the second information further includes at least one of the following: first indication information, where the first indication information indicates a valid time of the maximum quantity of activated carriers or the maximum quantity of activated cells; second indication information, where the second indication information indicates that the maximum quantity of activated carriers or the maximum quantity of activated cells is valid in the current radio resource control connection to the network device; and third indication information, where the third indication information indicates that the maximum quantity of activated carriers remains valid before the terminal device requests a new maximum quantity of activated carriers, or the third indication information indicates that the maximum quantity of activated cells remains valid before the terminal device requests a new maximum quantity of activated cells.

In a possible implementation, the method further includes: receiving second response information from the network device, where the second response information is used to respond to the second information.

The network device may use the second response information to ensure that the terminal device and the network device have consistent understandings of the maximum quantity of activated carriers or the maximum quantity of activated cells, to avoid activating, for the network device, carriers that exceed the maximum quantity of activated carriers or cells that exceed the maximum quantity of activated cells. This prevents the terminal device from working on the carriers or cells that exceed the quantity of carriers or cells supported by the terminal device, thereby ensuring user experience.

In a possible implementation, before the sending first information to the network device, the method further includes: receiving a configuration message from the network device, where the configuration message indicates at least one of the following: allowing the terminal device to request to suppress activation of a quantity of carriers; allowing the terminal device to request to suppress activation of a carrier; allowing or disallowing the terminal device to request to suppress activation of a carrier group; allowing or disallowing the terminal device to request to suppress activation of the carrier; allowing the terminal device to request to suppress activation of a quantity of cells; allowing the terminal device to request to suppress activation of a cell; allowing or disallowing the terminal device to request to suppress activation of a cell group; and allowing or disallowing the terminal device to request to suppress activation of the cell.

In a possible implementation, the requesting to suppress activation of the first carrier or the first carrier group includes: requesting to suppress activation of a downlink direction of the first carrier or the first carrier group, and/or requesting to suppress activation of an uplink direction of the first carrier or the first carrier group.

In a possible implementation, the requesting to suppress activation of the first cell or the first cell group includes: requesting to suppress activation of a downlink carrier in the first cell or the first cell group, and/or requesting to suppress activation of an uplink carrier in the first cell or the first cell group.

In a possible implementation, the first information further indicates that the first carrier is a supplementary uplink carrier, and/or the first carrier is a supplementary downlink carrier.

In a possible implementation, the first information further indicates an identifier of a cell corresponding to the first carrier whose activation is requested to be suppressed.

In a possible implementation, a reference signal is sent to the network device on the first carrier or the first carrier group whose activation is requested to be suppressed.

In a possible implementation, the sending first information to the network device includes: sending the first information to the network device when any one of the following conditions is met: a quantity of carriers activated by the network device is greater than the maximum quantity of activated carriers expected by the terminal device; a quantity of cells activated by the network device is greater than the maximum quantity of activated cells expected by the terminal device; a conflict or potential conflict exists between a PSCell in the first cell group and another cell; radio frequency interference exists between the PSCell in the first cell group and the another cell; a conflict or potential conflict exists between the first cell and another cell; radio frequency interference exists between the first cell and the another cell; a conflict or potential conflict exists between transmission on the first carrier or the first carrier group and transmission on a second carrier; the first carrier or the first carrier group and the second carrier cannot simultaneously work; and radio frequency interference exists between the first carrier or the first carrier group and the second carrier.

In a possible implementation, after the suppressing activation of the first carrier or the first carrier group, the method further includes: sending third information to the network device, where the third information indicates that suppression of activation of the first carrier or the first carrier group is removed, or the third information indicates that the first information is invalid.

In a possible implementation, after the suppressing activation of the first cell or the first cell group, the method further includes: sending third information to the network device, where the third information indicates that suppression of activation of the first cell or the first cell group is removed, or the third information indicates that the first information is invalid.

In a possible implementation, that suppression of activation of the first carrier or the first carrier group is removed, or the third information indicates that the first information is invalid includes: if the first carrier or the first carrier group is activated, the third information indicates to resume data scheduling on the first carrier or the first carrier group; and if the first carrier or the first carrier group is deactivated, the third information indicates that the first carrier or the first carrier group can be activated.

In a possible implementation, the second information may be carried in an RRC resume complete message, an RRC re-establishment request message, or an RRC re-establishment complete message.

In a possible implementation, the second response information may be carried in an RRC reconfiguration message.

According to a second aspect, this application provides a communication method. The method is performed by a network device, or a chip or module in the network device. An example in which the method is performed by the network device is used for description herein. The method includes: The network device sends a configuration information to a terminal device, and receives first information from the terminal device. The configuration information is used to configure a first carrier or a first carrier group, and the first information is used to request to suppress activation of the first carrier or the first carrier group. Alternatively, the configuration information is used to configure a first cell or a first cell group, and the first information is used to request to suppress activation of the first cell or the first cell group.

In a possible implementation, the suppressing activation of the first carrier or the first carrier group includes: when the first carrier or the first carrier group is activated, the first information is used to request to deactivate the first carrier or the first carrier group; and/or when the first carrier or the first carrier group is deactivated, the first information is used to request to keep a deactivated state of the first carrier or the first carrier group or is used to request not to activate the first carrier or the first carrier group.

In a possible implementation, the suppressing activation of the first cell or the first cell group includes: when the first cell or the first cell group is activated, the first information is used to request to deactivate the first cell or the first cell group; and/or when the first cell or the first cell group is deactivated, the first information is used to request to keep a deactivated state of the first cell or the first cell group or is used to request not to activate the first cell or the first cell group.

In a possible implementation, the method further includes: sending first response information to the terminal device, where the first response information is used to accept a request for suppressing activation of the first carrier or the first carrier group or accept a request for suppressing the first cell or the first cell group.

In a possible implementation, the first response information further indicates at least one of the following: indicating a valid time for suppressing activation of the first carrier or the first carrier group or the first cell or the first cell group; and indicating that a state in which activation of the first carrier or the first carrier group or the first cell or the first cell group is suppressed is valid in a current radio resource control connection to the terminal device.

In a possible implementation, the method further includes: receiving second information from the terminal device, where the second information indicates a maximum quantity of activated carriers expected by the terminal device, and the maximum quantity of activated carriers is less than or equal to a quantity of configured carriers supported by the terminal device.

In a possible implementation, the method further includes: sending second information to the network device, where the second information indicates a maximum quantity of activated cells expected by the terminal device, and the maximum quantity of activated cells is less than or equal to a quantity of configured cells supported by the terminal device.

In a possible implementation, the second information further includes at least one of the following: first indication information, where the first indication information indicates a valid time of the maximum quantity of activated carriers or the maximum quantity of activated cells; second indication information, where the second indication information indicates that the maximum quantity of activated carriers or the maximum quantity of activated cells is valid in the current radio resource control connection to the network device; and third indication information, where the third indication information indicates that the maximum quantity of activated carriers remains valid before the terminal device requests a new maximum quantity of activated carriers, or the third indication information indicates that the maximum quantity of activated cells remains valid before the terminal device requests a new maximum quantity of activated cells.

In a possible implementation, the method further includes: sending second response information to the terminal device, where the second response information is used to respond to the second information.

In a possible implementation, the method further includes: sending a configuration message to the terminal device, where the configuration message indicates at least one of the following: allowing the terminal device to request to suppress activation of a quantity of carriers; allowing the terminal device to request to suppress activation of a carrier; allowing or disallowing the terminal device to request to suppress activation of a carrier group; allowing or disallowing the terminal device to request to suppress activation of the carrier; allowing the terminal device to request to suppress activation of a quantity of cells; allowing the terminal device to request to suppress activation of a cell; allowing or disallowing the terminal device to request to suppress activation of a cell group; and allowing or disallowing the terminal device to request to suppress activation of the cell.

In a possible implementation, the requesting to suppress activation of the first carrier or the first carrier group includes: requesting to suppress activation of a downlink direction of the first carrier or the first carrier group, and/or requesting to suppress activation of an uplink direction of the first carrier or the first carrier group.

In a possible implementation, the requesting to suppress activation of the first cell or the first cell group includes: requesting to suppress activation of a downlink carrier in the first cell or the first cell group, and/or requesting to suppress activation of an uplink carrier in the first cell or the first cell group.

In a possible implementation, the first information further indicates that the first carrier is a supplementary uplink carrier, and/or the first carrier is a supplementary downlink carrier.

In a possible implementation, the first information further indicates an identifier of a cell corresponding to the first carrier whose activation is requested to be suppressed.

In a possible implementation, a reference signal from the terminal device is received on the first carrier or the first carrier group whose activation is requested to be suppressed.

In a possible implementation, a reason or purpose of sending the first information includes: a quantity of carriers activated by the network device is greater than the maximum quantity of activated carriers expected by the terminal device; a conflict or potential conflict exists between transmission on the first carrier or the first carrier group and transmission on a second carrier; the first carrier or the first carrier group and the second carrier cannot simultaneously work; radio frequency interference exists between the first carrier or the first carrier group and the second carrier; a quantity of cells activated by the network device is greater than the maximum quantity of activated cells expected by the terminal device; a conflict or potential conflict exists between a PSCell in the first cell group and another cell; radio frequency interference exists between the PSCell in the first cell group and the another cell; a conflict or potential conflict exists between the first cell and another cell; and radio frequency interference exists between the first cell and the another cell.

In a possible implementation, the method further includes: receiving third information from the terminal device, where the third information indicates that suppression of activation of the first carrier or the first carrier group is removed, or the third information indicates that the first information is invalid.

In a possible implementation, after the suppressing activation of the first cell or the first cell group, the method further includes: sending third information to the network device, where the third information indicates that suppression of activation of the first cell or the first cell group is removed, or the third information indicates that the first information is invalid.

In a possible implementation, that suppression of activation of the first carrier or the first carrier group is removed, or the third information indicates that the first information is invalid includes: if the first carrier or the first carrier group is activated, the third information indicates to resume data scheduling on the first carrier or the first carrier group; and if the first carrier or the first carrier group is deactivated, the third information indicates that the first carrier or the first carrier group can be activated.

According to a third aspect, this application provides a communication method. The method is performed by a terminal device, or a chip or module in the terminal device. An example in which the method is performed by the terminal device is used for description herein. The method includes: receiving, by the terminal device, configuration information from a network device; receiving, by the terminal device, frequency configuration information from the network device, where the frequency configuration information is used to configure a first frequency; and sending indication information to the network device, where the indication information indicates at least one of the following: skipping configuring the first frequency as a secondary component carrier SCC; and skipping activating the SCC configured based on the first frequency, where the first frequency can be configured as only a primary component carrier PCC.

According to the solution provided in this application, how to configure the first frequency is indicated by using the indication information, so that the network can be prevented from configuring/activating the first frequency whose hardware capability has been occupied as the SCC, thereby avoiding occurrence of a conflict in advance, and avoiding a packet error caused by a hardware conflict. Therefore, in this application, a frequency application limitation is explicitly reported, to help the network better configure the first frequency, thereby ensuring service quality and user experience.

In a possible implementation, the indication information is carried in a measurement report or a carrier deactivation request message.

An advantage of carrying the indication information in the measurement report is as follows: First, before a carrier frequency is configured as an SCC or a PCC, if a hardware resource of the carrier frequency is already occupied, the terminal device may determine, in a current BC combination, a carrier frequency on which a hardware conflict may occur. In addition, the carrier frequency on which the conflict may occur is indicated to the network device in advance, thereby avoiding occurrence of the hardware conflict in advance and ensuring user experience. Second, measurement reporting may be performed to the network purposefully to ensure that mobility measurement is not affected.

In a possible implementation, before the indication information is sent to the network device, it is determined that any one of the following conditions is met: a hardware resource associated with the first frequency is occupied by a second frequency; a potential conflict exists between transmission of the first frequency and transmission of the second frequency; the first frequency and the second frequency cannot simultaneously work; and radio frequency interference exists between the first frequency and the second frequency. The second frequency is a frequency configured by the network device for the terminal device.

In a possible implementation, before the indication information is sent to the network device, the first frequency is not configured as the SCC or the PCC.

According to a fourth aspect, this application provides a communication method. The method is performed by a network device, or a chip or module in the network device. An example in which the method is performed by the network device is used for description herein. The method includes: sending, by the network device, frequency configuration information to a terminal device, where the frequency configuration information is used to configure a first frequency; and receiving indication information from the terminal device, where the indication information indicates at least one of the following: skipping configuring the first frequency as a secondary component carrier SCC; and skipping activating the SCC configured based on the first frequency, where the first frequency can be configured as only a primary component carrier PCC.

In a possible implementation, the indication information is carried in a measurement report or a carrier deactivation request message.

In a possible implementation, the indication information is sent when it is determined that any one of the following conditions is met: a hardware resource associated with the first frequency is occupied by a second frequency; a potential conflict exists between transmission of the first frequency and transmission of the second frequency; the first frequency and the second frequency cannot simultaneously work; and radio frequency interference exists between the first frequency and the second frequency.

In a possible implementation, before the indication information is received, the first frequency is not configured as the SCC or the PCC.

According to a fifth aspect, this application further provides a communication apparatus. The communication apparatus implements any method provided in the first aspect or the third aspect. The communication apparatus may be implemented by hardware, or may be implemented by executing corresponding software by hardware. The hardware or the software includes one or more units or modules corresponding to the foregoing function.

In a possible implementation, the communication apparatus includes a processor. The processor is configured to support the communication apparatus in performing a corresponding function of the terminal device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as an access network device.

In a possible implementation, the communication apparatus includes corresponding functional modules, configured to implement the steps in the foregoing method. The function may be implemented by hardware, or may be implemented by executing corresponding software by hardware. The hardware or the software includes one or more modules corresponding to the foregoing function.

In a possible implementation, a structure of the communication apparatus includes a processing unit and a communication unit. The units may perform corresponding functions in the foregoing method example. For details, refer to the descriptions in the method provided in the first aspect or the third aspect. Details are not described herein again.

In a possible implementation, when the communication apparatus implements the method provided in the first aspect, the processing unit receives configuration information from a network device by using the communication unit, and sends first information to the network device. The configuration information is used to configure a first carrier or a first carrier group, and the first information is used to request to suppress activation of the first carrier or the first carrier group. Alternatively, the configuration information is used to configure a first cell or a first cell group, and the first information is used to request to suppress activation of the first cell or the first cell group.

In a possible implementation, the suppressing activation of the first carrier or the first carrier group includes: when the first carrier or the first carrier group is activated, the first information is used to request to deactivate the first carrier or the first carrier group; and/or when the first carrier or the first carrier group is deactivated, the first information is used to request to keep a deactivated state of the first carrier or the first carrier group or is used to request not to activate the first carrier or the first carrier group.

In a possible implementation, the suppressing activation of the first cell or the first cell group includes: when the first cell or the first cell group is activated, the first information is used to request to deactivate the first cell or the first cell group; and/or when the first cell or the first cell group is deactivated, the first information is used to request to keep a deactivated state of the first cell or the first cell group or is used to request not to activate the first cell or the first cell group.

In a possible implementation, the communication unit is further configured to: suppress activation of the first carrier or the first carrier group if first response information from the network device is received. Alternatively, the processing unit is further configured to suppress activation of the first carrier or the first carrier group or suppress activation of the first cell or the first cell group if first response information from the network device is not received within first duration after the first information is sent.

In a possible implementation, the processing unit is specifically configured to: start a timer when the first information is sent, where timing duration of the timer is the first duration; stop the timer when the first response information from the network device is received; and when the timer expires, suppress activation of the first carrier or the first carrier group if the first response information is not received.

In a possible implementation, the first response information further indicates at least one of the following: indicating a valid time for suppressing activation of the first carrier or the first carrier group or the first cell or the first cell group; and indicating that a state in which activation of the first carrier or the first carrier group or the first cell or the first cell group is suppressed is valid in a current radio resource control connection to the network device.

In a possible implementation, the communication unit is further configured to send second information to the network device, where the second information indicates a maximum quantity of activated carriers expected by the terminal device, and the maximum quantity of activated carriers is less than or equal to a quantity of configured carriers supported by the terminal device.

In a possible implementation, the communication unit is further configured to second information to the network device, where the second information indicates a maximum quantity of activated cells expected by the terminal device, and the maximum quantity of activated cells is less than or equal to a quantity of configured cells supported by the terminal device.

In a possible implementation, the second information further includes at least one of the following: first indication information, where the first indication information indicates a valid time of the maximum quantity of activated carriers or the maximum quantity of activated cells; second indication information, where the second indication information indicates that the maximum quantity of activated carriers or the maximum quantity of activated cells is valid in the current radio resource control connection to the network device; and third indication information, where the third indication information indicates that the maximum quantity of activated carriers remains valid before the terminal device requests a new maximum quantity of activated carriers, or the third indication information indicates that the maximum quantity of activated cells remains valid before the terminal device requests a new maximum quantity of activated cells.

In a possible implementation, the communication unit is further configured to receive second response information from the network device, where the second response information is used to respond to the second information.

In a possible implementation, before sending the first information to the network device, the communication unit is further configured to receive a configuration message from the network device, where the configuration message indicates at least one of the following: allowing the terminal device to request to suppress activation of a quantity of carriers; allowing the terminal device to request to suppress activation of a carrier; allowing or disallowing the terminal device to request to suppress activation of a carrier group; allowing or disallowing the terminal device to request to suppress activation of the carrier; allowing the terminal device to request to suppress activation of a quantity of cells; allowing the terminal device to request to suppress activation of a cell; allowing or disallowing the terminal device to request to suppress activation of a cell group; and allowing or disallowing the terminal device to request to suppress activation of the cell.

In a possible implementation, the requesting to suppress activation of the first carrier or the first carrier group includes: requesting to suppress activation of a downlink direction of the first carrier or the first carrier group, and/or requesting to suppress activation of an uplink direction of the first carrier or the first carrier group.

In a possible implementation, the requesting to suppress activation of the first cell or the first cell group includes: requesting to suppress activation of a downlink carrier in the first cell or the first cell group, and/or requesting to suppress activation of an uplink carrier in the first cell or the first cell group.

In a possible implementation, the first information further indicates that the first carrier is a supplementary uplink carrier, and/or the first carrier is a supplementary downlink carrier.

In a possible implementation, the first information further indicates an identifier of a cell corresponding to the first carrier whose activation is requested to be suppressed.

In a possible implementation, a reference signal is sent to the network device on the first carrier or the first carrier group whose activation is requested to be suppressed.

In a possible implementation, the sending first information to the network device includes: sending the first information to the network device when any one of the following conditions is met: a quantity of carriers activated by the network device is greater than the maximum quantity of activated carriers expected by the terminal device; a quantity of cells activated by the network device is greater than the maximum quantity of activated cells expected by the terminal device; a conflict or potential conflict exists between a PSCell in the first cell group and another cell; radio frequency interference exists between the PSCell in the first cell group and the another cell; a conflict or potential conflict exists between the first cell and another cell; radio frequency interference exists between the first cell and the another cell; a conflict or potential conflict exists between transmission on the first carrier or the first carrier group and transmission on a second carrier; the first carrier or the first carrier group and the second carrier cannot simultaneously work; and radio frequency interference exists between the first carrier or the first carrier group and the second carrier.

In a possible implementation, after activation of the first carrier or the first carrier group is suppressed, the communication unit is further configured to send third information to the network device, where the third information indicates that suppression of activation of the first carrier or the first carrier group is removed, or the third information indicates that the first information is invalid.

In a possible implementation, after activation of the first cell or the first cell group is suppressed, the communication unit is further configured to send third information to the network device, where the third information indicates that suppression of activation of the first cell or the first cell group is removed, or the third information indicates that the first information is invalid.

In a possible implementation, that suppression of activation of the first carrier or the first carrier group is removed, or the third information indicates that the first information is invalid includes: if the first carrier or the first carrier group is activated, the third information indicates to resume data scheduling on the first carrier or the first carrier group; and if the first carrier or the first carrier group is deactivated, the third information indicates that the first carrier or the first carrier group can be activated.

In a possible implementation, the second information may be carried in an RRC resume complete message, an RRC re-establishment request message, or an RRC re-establishment complete message.

In a possible implementation, the second response information may be carried in an RRC reconfiguration message.

According to a sixth aspect, this application further provides a communication apparatus. The communication apparatus implements any method provided in the second aspect or the fourth aspect. The communication apparatus may be implemented by hardware, or may be implemented by executing corresponding software by hardware. The hardware or the software includes one or more units or modules corresponding to the foregoing function.

In a possible implementation, the communication apparatus includes a processor. The processor is configured to support the communication apparatus in performing a corresponding function of the access network device in the foregoing method. The communication apparatus may further include a memory. The memory may be coupled to the processor, and the memory stores program instructions and data that are necessary for the communication apparatus. Optionally, the communication apparatus further includes an interface circuit. The interface circuit is configured to support communication between the communication apparatus and a device such as a terminal device.

In a possible implementation, the communication apparatus includes corresponding functional modules, configured to implement the steps in the foregoing method. The function may be implemented by hardware, or may be implemented by executing corresponding software by hardware. The hardware or the software includes one or more modules corresponding to the foregoing function.

In a possible implementation, a structure of the communication apparatus includes a processing unit and a communication unit. The units may perform corresponding functions in the foregoing method example. For details, refer to the descriptions in the method provided in the second aspect or the fourth aspect. Details are not described herein again.

In a possible implementation, when the communication apparatus implements the method provided in the second aspect, the processing unit sends configuration information to the terminal device by using the communication unit, and receives first information from the terminal device. The configuration information is used to configure a first carrier or a first carrier group, and the first information is used to request to suppress activation of the first carrier or the first carrier group. Alternatively, the configuration information is used to configure a first cell or a first cell group, and the first information is used to request to suppress activation of the first cell or the first cell group.

In a possible implementation, the suppressing activation of the first carrier or the first carrier group includes: when the first carrier or the first carrier group is activated, the first information is used to request to deactivate the first carrier or the first carrier group; and/or when the first carrier or the first carrier group is deactivated, the first information is used to request to keep a deactivated state of the first carrier or the first carrier group or is used to request not to activate the first carrier or the first carrier group.

In a possible implementation, the suppressing activation of the first cell or the first cell group includes: when the first cell or the first cell group is activated, the first information is used to request to deactivate the first cell or the first cell group; and/or when the first cell or the first cell group is deactivated, the first information is used to request to keep a deactivated state of the first cell or the first cell group or is used to request not to activate the first cell or the first cell group.

In a possible implementation, the communication unit is further configured to send first response information to the terminal device, where the first response information is used to accept a request for suppressing activation of the first carrier or the first carrier group or accept a request for suppressing the first cell or the first cell group.

In a possible implementation, the first response information further indicates at least one of the following: indicating a valid time for suppressing activation of the first carrier or the first carrier group or the first cell or the first cell group; and indicating that a state in which activation of the first carrier or the first carrier group or the first cell or the first cell group is suppressed is valid in a current radio resource control connection to the terminal device.

In a possible implementation, the communication unit is further configured to receive second information from the terminal device, where the second information indicates a maximum quantity of activated carriers expected by the terminal device, and the maximum quantity of activated carriers is less than or equal to a quantity of configured carriers supported by the terminal device.

In a possible implementation, the communication unit is further configured to second information to the network device, where the second information indicates a maximum quantity of activated cells expected by the terminal device, and the maximum quantity of activated cells is less than or equal to a quantity of configured cells supported by the terminal device.

In a possible implementation, the second information further includes at least one of the following: first indication information, where the first indication information indicates a valid time of the maximum quantity of activated carriers or the maximum quantity of activated cells; second indication information, where the second indication information indicates that the maximum quantity of activated carriers or the maximum quantity of activated cells is valid in the current radio resource control connection to the network device; and third indication information, where the third indication information indicates that the maximum quantity of activated carriers remains valid before the terminal device requests a new maximum quantity of activated carriers, or the third indication information indicates that the maximum quantity of activated cells remains valid before the terminal device requests a new maximum quantity of activated cells.

In a possible implementation, the communication unit is further configured to send second response information to the terminal device, where the second response information is used to respond to the second information.

In a possible implementation, the method further includes: sending a configuration message to the terminal device, where the configuration message indicates at least one of the following: allowing the terminal device to request to suppress activation of a quantity of carriers; allowing the terminal device to request to suppress activation of a carrier; allowing or disallowing the terminal device to request to suppress activation of a carrier group; allowing or disallowing the terminal device to request to suppress activation of the carrier; allowing the terminal device to request to suppress activation of a quantity of cells; allowing the terminal device to request to suppress activation of a cell; allowing or disallowing the terminal device to request to suppress activation of a cell group; and allowing or disallowing the terminal device to request to suppress activation of the cell.

In a possible implementation, the requesting to suppress activation of the first carrier or the first carrier group includes: requesting to suppress activation of a downlink direction of the first carrier or the first carrier group, and/or requesting to suppress activation of an uplink direction of the first carrier or the first carrier group.

In a possible implementation, the requesting to suppress activation of the first cell or the first cell group includes: requesting to suppress activation of a downlink carrier in the first cell or the first cell group, and/or requesting to suppress activation of an uplink carrier in the first cell or the first cell group.

In a possible implementation, the first information further indicates that the first carrier is a supplementary uplink carrier, and/or the first carrier is a supplementary downlink carrier.

In a possible implementation, the first information further indicates an identifier of a cell corresponding to the first carrier whose activation is requested to be suppressed.

In a possible implementation, a reference signal from the terminal device is received on the first carrier or the first carrier group whose activation is requested to be suppressed.

In a possible implementation, a reason or purpose of sending the first information includes: a quantity of carriers activated by the network device is greater than the maximum quantity of activated carriers expected by the terminal device; a conflict or potential conflict exists between transmission on the first carrier or the first carrier group and transmission on a second carrier; the first carrier or the first carrier group and the second carrier cannot simultaneously work; radio frequency interference exists between the first carrier or the first carrier group and the second carrier; a quantity of cells activated by the network device is greater than the maximum quantity of activated cells expected by the terminal device; a conflict or potential conflict exists between a PSCell in the first cell group and another cell; radio frequency interference exists between the PSCell in the first cell group and the another cell; a conflict or potential conflict exists between the first cell and another cell; and radio frequency interference exists between the first cell and the another cell.

In a possible implementation, the communication unit is further configured to receive third information from the terminal device, where the third information indicates that suppression of activation of the first carrier or the first carrier group is removed, or the third information indicates that the first information is invalid.

In a possible implementation, after activation of the first cell or the first cell group is suppressed, the communication unit is further configured to send third information to the network device, where the third information indicates that suppression of activation of the first cell or the first cell group is removed, or the third information indicates that the first information is invalid.

In a possible implementation, that suppression of activation of the first carrier or the first carrier group is removed, or the third information indicates that the first information is invalid includes: if the first carrier or the first carrier group is activated, the third information indicates to resume data scheduling on the first carrier or the first carrier group; and if the first carrier or the first carrier group is deactivated, the third information indicates that the first carrier or the first carrier group can be activated.

According to a seventh aspect, a communication apparatus is provided, including a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to execute computer programs or instructions stored in a memory, to implement the method in any one of the first aspect or the third aspect and any possible implementation of any one of the aspects.

According to an eighth aspect, a communication apparatus is provided, including a processor and an interface circuit. The interface circuit is configured to receive a signal from a communication apparatus other than the communication apparatus and transmit the signal to the processor, or send a signal from the processor to a communication apparatus other than the communication apparatus. The processor is configured to execute computer programs or instructions stored in a memory, to implement the method in any one of the second aspect or the fourth aspect and any possible implementation of any one of the aspects.

According to a ninth aspect, a computer-readable storage medium is provided, where the computer-readable storage medium stores computer programs or instructions. When the computer programs or the instructions are run on a computer, the computer is enabled to implement the method in any one of the first aspect to the fourth aspect and any possible implementation of any one of the aspects.

According to a tenth aspect, a computer program product that stores computer-readable instructions is provided. When the computer-readable instructions are run on a computer, the computer is enabled to implement the method in any one of the first aspect to the fourth aspect and any possible implementation of any one of the aspects.

According to an eleventh aspect, a communication apparatus is provided, including a processor and an interface circuit. Optionally, the communication apparatus further includes a memory.

The interface circuit is configured to receive a signal from a communication apparatus other than the communication apparatus and transmit the signal to the processor, or send a signal from the processor to a communication apparatus other than the communication apparatus. The processor is configured to execute computer programs or instructions, so that the communication apparatus implements the method in any one of the first aspect or the third aspect and any possible implementation of any one of the aspects. Optionally, the memory stores the computer programs or the instructions.

According to a twelfth aspect, a communication apparatus is provided, including a processor and an interface circuit. Optionally, the communication apparatus further includes a memory. The interface circuit is configured to receive a signal from a communication apparatus other than the communication apparatus and transmit the signal to the processor, or send a signal from the processor to a communication apparatus other than the communication apparatus. The processor is configured to execute computer programs or instructions, so that the communication apparatus implements the method in any one of the second aspect or the fourth aspect and any possible implementation of any one of the aspects. Optionally, the memory stores the computer programs or the instructions.

According to a thirteenth aspect, a chip is provided, including a processor. The processor is coupled to a memory and is configured to execute computer programs or instructions stored in the memory, so that the chip implements the method in any one of the first aspect or the third aspect and any possible implementation of any one of the aspects.

According to a fourteenth aspect, a chip is provided, including a processor. The processor is coupled to a memory and is configured to execute computer programs or instructions stored in the memory, so that the chip implements the method in any one of the second aspect or the fourth aspect and any possible implementation of any one of the aspects.

According to a fifteenth aspect, a communication system is provided. The system includes the apparatus (for example, a terminal device) according to the fifth aspect and the apparatus (for example, a network device) according to the sixth aspect.

BRIEF DESCRIPTION OF THE DRAWINGS

FIG. 5(*a*) and FIG. 5(*b*) are schematic diagrams of MAC CE formats according to an embodiment of this application;

FIG. 6 is a schematic diagram of a resource conflict according to an embodiment of this application;

DETAILED DESCRIPTION OF ILLUSTRATIVE EMBODIMENTS

The following describes embodiments of this application in detail with reference to accompanying drawings of this specification.

Technical solutions in embodiments of this application may be applied to various communication systems such as a 5th generation (5G) mobile communication system and a 4G mobile communication system. The 5G mobile communication system includes but is not limited to an NR system. The 4G mobile communication system includes but is not limited to a long term evolution (LTE) system, and the like. This is not limited herein.

In embodiments of this application, a terminal device may be a device with a wireless transceiver function, and may also be referred to as user equipment (UE), an access terminal, a subscriber unit, a subscriber station, a mobile station, a remote station, a remote terminal, a mobile device, a user terminal, a wireless communication device, a user agent, a user apparatus, or the like. The terminal device in embodiments of this application may be a mobile phone (mobile phone), a tablet computer (Pad), a computer with a wireless transceiver function, a virtual reality (VR) terminal, an augmented reality (AR) terminal, a wireless terminal in industrial control, a wireless terminal in self-driving, or the like.

In embodiments of this application, a network device may connect the terminal device to a radio access network (RAN), and may be a radio access device in various standards. For example, the network device may be a next generation NodeB (gNB) in the NR system, or may be an evolved NodeB (eNB), a radio network controller (RNC) or a NodeB (NB), a base station controller (BSC), a base transceiver station (BTS), a home base station (for example, home evolved NodeB or home NodeB, HNB), a baseband unit (BBU), an access point (AP) in a wireless fidelity (Wi-Fi) system, a wireless relay node, a wireless backhaul node, a transmission point (transmission and reception point, TRP or transmission point, TP), or the like. The network device may alternatively be a gNB or a transmission point (TRP or TP) in the 5G (NR) system, or one antenna panel or one group of antenna panels (including a plurality of antenna panels) of a base station in the 5G system. The network device may alternatively be a network node forming the gNB or the transmission point, for example, a baseband unit (BBU), or a DU in a central unit-distributed unit (CU-DU) architecture.

Figure 1:
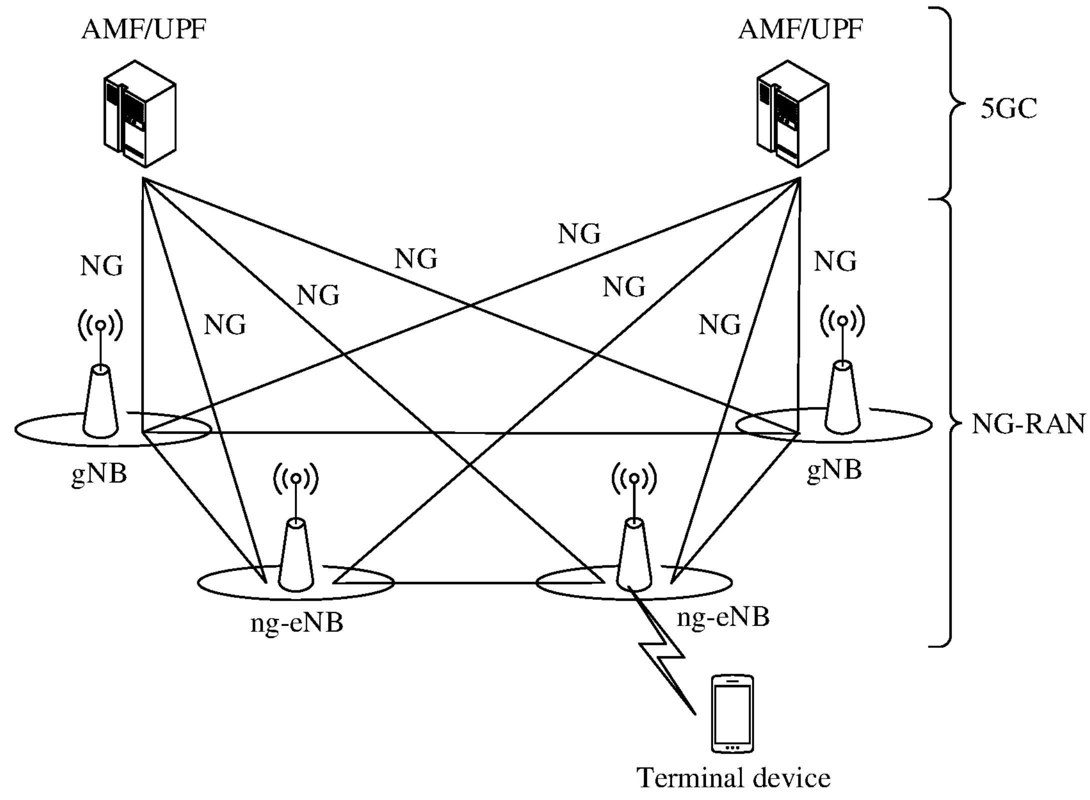
FIG. 1 is a schematic diagram of a network architecture applicable to this application.

Embodiments of this application may be applied to a 5G or 4G mobile communication system that is independently deployed, or may be applied to a 5G or 4G mobile communication system that is not independently deployed, for example, dual connectivity (DC). For example, FIG. 1 is a schematic diagram of a network architecture applicable to an embodiment of this application. As shown in FIG. 1, the network includes 5G core (5GC) and a next-generation radio access network (NG-RAN). The 5GC includes a plurality of core network devices, for example, an access and mobility management (AMF) network element and a user plane function (UPF) network element. The NG-RAN includes a gNB, a ng-eNB, and the like. The gNB may provide an NR user plane and control plane protocol terminal for a terminal device. The ng-eNB provides an evolved universal terrestrial radio access (E-UTRA) user plane and control plane protocol terminal for the terminal device. The gNB and the ng-eNB are connected to each other through an Xn interface.

Figure 2:
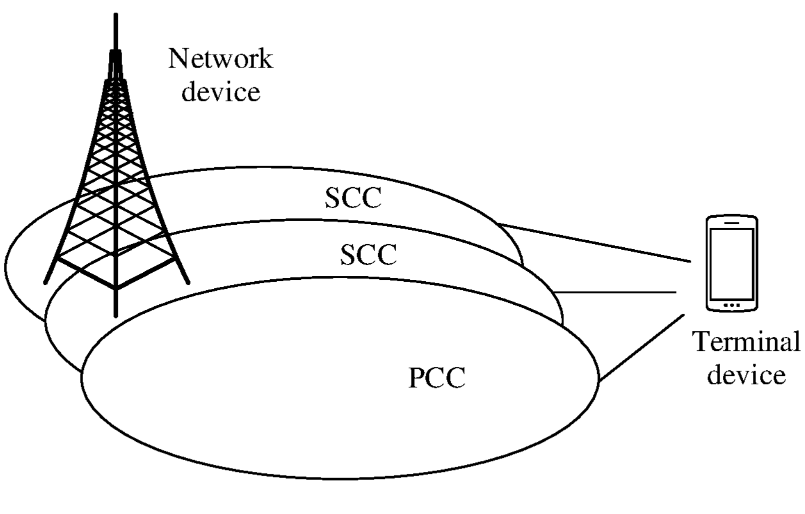
FIG. 2 is a schematic diagram of carrier aggregation according to an embodiment of this application.

Embodiments of this application may be further applied to a multi-carrier transmission scenario, including but not limited to CA, supplementary uplink (SUL), and supplementary downlink (SDL) scenarios. For example, CA is used as an example. As shown in FIG. 2, on a network side, a plurality of component carriers (CCs) may be aggregated, and an aggregated component carrier may be configured for use by a terminal device, thereby increasing a bandwidth and improving a data transmission rate. FIG. 2 shows a scenario in which three carriers are aggregated. The terminal device may simultaneously use the three carriers. Among the three carriers, one carrier is referred to as a primary carrier component (PCC), and a cell corresponding to the PCC is referred to as a primary cell (PCell). The other two carriers are referred to as secondary carrier components (SCCs), and a cell corresponding to the SCC is referred to as a secondary cell (SCell).

In conventional CA, one time division duplex (TDD) carrier (the carrier includes an uplink part and a downlink part) or a pair of frequency division duplex (FDD) carriers (one downlink carrier and one uplink carrier) corresponds/correspond to one cell. After an SUL is introduced, one FDD cell corresponds to one downlink carrier and two uplink carriers (normal uplink/non-supplementary uplink (NUL) carrier and SUL carrier), or one TDD cell corresponds to two carriers: one NUL carrier and one SUL carrier.

In addition, the component carrier (CC) may also be referred to as a carrier component (CC). For ease of description, the component carrier is collectively referred to as the carrier component or a carrier in embodiments of this application.

Figure 3:
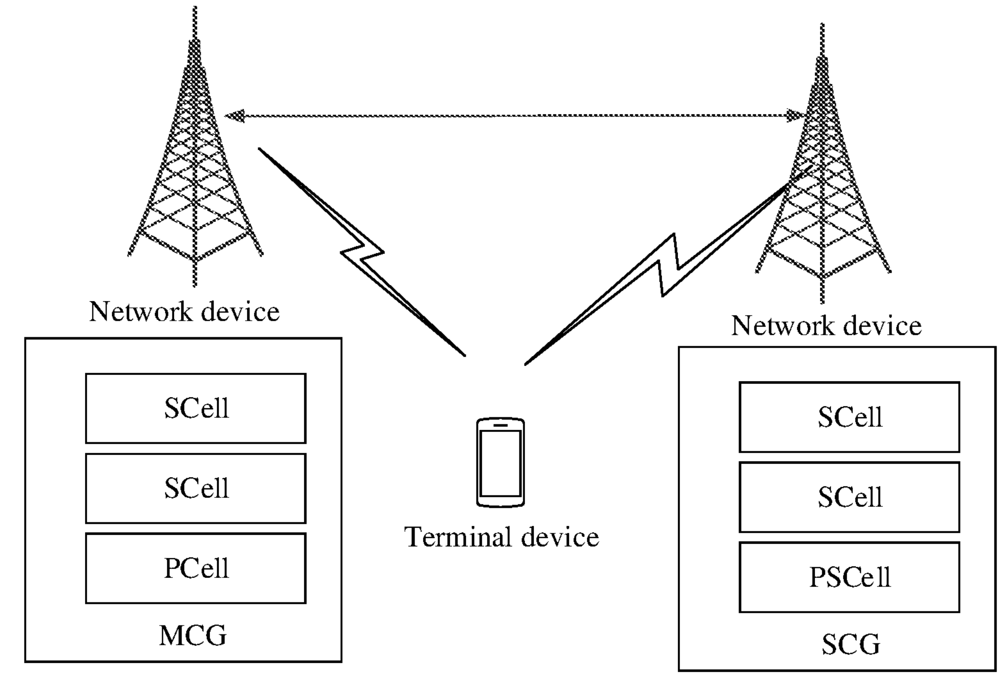
FIG. 3 is a schematic diagram of carrier aggregation according to an embodiment of this application.

When this application is applied to a DC scenario, as shown in FIG. 3, a terminal device establishes a connection to two network devices (the network devices herein refer to logical network devices) in a DC manner. One of the two network devices is a master node (MN), and the other network device is a secondary node (SN). Both the MN and the SN can perform CA independently. Cells that associate with the MN and that are combined through CA form a master cell group (MCG), and cells that associate with the SN and that are combined through CA form a secondary cell group (SCG). If dual connectivity is not performed, a group of cells communicating with the terminal device is the MCG.

The MCG includes one primary cell PCell and at least one secondary cell (SCell). The SCG includes one primary secondary cell (PSCell) and at least one SCell. The PCell in the MCG and the SCell in the MCG are combined by using a carrier aggregation (CA) technology. The PSCell in the SCG and the SCell in the SCG are also combined by using the carrier aggregation technology.

Figure 4:
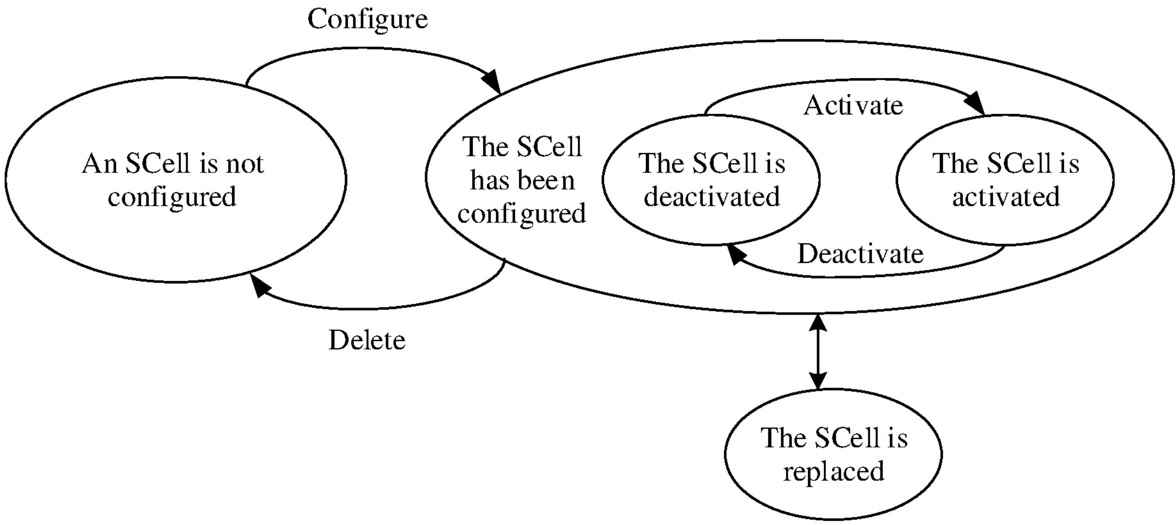
FIG. 4 is a schematic diagram of state switching of a secondary cell according to an embodiment of this application.

In embodiments of this application, because the terminal device accesses a plurality of SCells, the network device needs to manage the SCells. Management of the SCells includes configuration (addition), deletion, replacement, activation, deactivation, and the like of the SCells. A relationship between states of the SCells may be shown in FIG. 4.

1. SCell configuration: New SCells are configured for the terminal device. The network device establishes a CA frequency set and frequencies included in the CA frequency set through configuration, and a cell corresponding to these frequencies is a candidate SCell. After the terminal device establishes a radio resource control (RRC) connection to a PCell, the PCell determines, with reference to the candidate SCells and a capability of the terminal device, SCells to which the terminal device needs to be added, and sends identifiers of these SCells to the terminal device by using an RRC reconfiguration message. The terminal device adds the SCells based on the identifiers of the SCells. During specific addition, there are two manners of configuring the SCells: blind configuration and measurement-based configuration. When the blind configuration is used, the terminal device directly configures the SCells based on the identifiers of the SCells delivered by the network device, and the network device does not need to obtain signal quality measurement results of the cells from the terminal device. When the measurement-based configuration is used, signal quality of the cells needs to be considered. A cell can be configured as an SCell only when signal quality of the cell meets a specific condition.

2. SCell activation/deactivation: Only an activated SCell can send or receive data, and a deactivated SCell cannot send or receive data. The network device controls when the SCell is activated, and generally determines, based on a data service of the terminal device, whether to activate the SCell. When a volume of a data service to be transmitted by the terminal device is large, the network device activates the SCell. SCell deactivation is determined by the network device on one hand, and may alternatively be determined by the terminal device on the other hand. When the volume of the data service is small, the network device deactivates the SCell. "Determined by the terminal device" means that the terminal device sets a deactivation timer for each SCell. The deactivation timer starts when each SCell is activated (duration of the deactivation timer is delivered during SCell configuration). If the SCell does not detect control or service data within the running duration of the timer, the SCell is automatically deactivated to reduce power consumption.

The network device dynamically controls SCell activation and deactivation by using an SCell activation/deactivation medium access control (MAC) control element (CE). Formats of the SCell activation/deactivation MAC CEs may be shown in FIG. 5(*a*) and FIG. 5(*b*). A MAC CE in FIG. 5(*a*) includes one octet, and may indicate states of seven SCells. A MAC CE in FIG. 5(*b*) includes four octets, and may indicate states of 31 SCells. In FIG. 5(*a*) and FIG. 5(*b*), each Ci occupies one bit, indicating that a state of an SCell corresponding to the bit is activated/deactivated, the subscript i represents an SCell index, and i is an integer greater than 0. For example, when Ci=0, it indicates that a state of an SCell i corresponding to Ci is deactivated. When Ci=1, it indicates that the state of the SCell i corresponding to Ci is activated. R is a reserved bit. If no SCell is configured, a corresponding bit is ignored.

3. SCell replacement: The SCell is replaced with an SCell with better signal quality for the terminal device. When there is a cell with better signal quality (for example, when the terminal device moves to an edge of the original SCell), to ensure the data transmission rate of the terminal device, the terminal device may replace the SCell.

4. SCell deletion: An SCell whose signal quality is lower than a specified threshold is deleted.

In an initial registration procedure, the network device may obtain a radio capability of the terminal device. The radio capability is referred to as the capability for short below. The capability of the terminal device may include a CA capability of the terminal device. The CA capability of the terminal device may be a capability related to a band combination that can be supported by the terminal device. For example, the CA capability may indicate a maximum quantity of carriers that can be aggregated, a maximum aggregated bandwidth, a CA type, and a carrier band that are supported by the terminal device. The CA type may include the following three types:

(1) Intra-band contiguous carrier aggregation: Carriers used for CA belong to a same band and are contiguous in frequency domain.

(2) Intra-band non-contiguous carrier aggregation: Carriers used for CA belong to a same band but are non-contiguous in frequency domain.

(3) Inter-band carrier aggregation: Carriers used for CA belong to different bands.

The network device performs CA based on the capability of the terminal device. However, the capability of the terminal device indicates a maximum capability that can be supported by the terminal device. For the terminal device, in a specific scenario, the terminal device may not work based on the maximum capability.

For example, a quantity of carriers used for CA that is supported by the terminal device is used as an example. In some scenarios, the quantity of carriers used for CA that can be supported by the terminal device may be less than a quantity of carriers used for CA that is indicated in the capability of the terminal device. For a terminal device that has hardware capability sharing, for example, a terminal device that supports dual subscriber identity module (SIM) cards, each SIM card is independent of each other, but the two SIM cards share a hardware resource of the terminal device. When the two SIM cards simultaneously receive/transmit data, a quantity of carriers used for CA that can be supported by each SIM card is less than a quantity of carriers used for CA that is supported when a single SIM card works. Alternatively, when a temperature of the terminal device is extremely low (overcooled) or a temperature of the terminal device is excessively high (overheated), or when a battery level of the terminal device is excessively low, or when the terminal device expects to save power, a quantity of carriers used for CA that is expected by the terminal device is less than the quantity of carriers used for CA that is indicated by the capability of the terminal device. If mobile registration update is performed to update the capability of the terminal device, a currently executed service is interrupted, and user experience is greatly affected.

Further, the terminal device that supports the dual SIM cards is used as an example. For a network device, the terminal device that supports the dual SIM cards is considered as two independent terminal devices. The two SIM cards may belong to a same operator or different operators. However, for a terminal device side, the two SIM cards actually share the hardware resource. For example, when the hardware resource is used for a terminal device that supports a single SIM card, the single SIM card supports a maximum of five CCs. However, for the terminal device that supports the dual SIM cards and that has the same hardware resource, a sum of capabilities actually supported by the dual SIM cards does not exceed the five CCs. Generally, a primary SIM card can support a service (for example, a game service or a video service) that requires a high rate. To support a higher data rate, a capability reported by the terminal device to a network corresponding to the primary SIM card is that a maximum of four CCs is supported. A secondary SIM card supports only a service (for example, a voice service) that requires a low rate, and a capability reported by the terminal device to a network corresponding to the secondary SIM card is that a maximum of one CC is supported. In this way, the network corresponding to the primary SIM card may configure the maximum of four CCs for the terminal device, and the network corresponding to the secondary SIM card may configure the maximum of one CC for the terminal device. However, radio frequency resources associated with the carriers used by the primary SIM card and the secondary SIM card may conflict. For example, as shown in FIG. 6, a radio frequency resource of the terminal device includes four radio frequency integrated circuits (RFICs). In addition, the four CCs configured by the network corresponding to the primary SIM card include a PCC, and an SCC 1 to an SCC 3. The PCC is associated with an RFIC 0, the SCC 1 is associated with an RFIC 1, the SCC 2 is associated with an RFIC 2, and the SCC 3 is associated with an RFIC 3. The one CC configured by the network corresponding to the secondary SIM card is a PCC and is associated with the RFIC 1. Because the RFIC 1 is simultaneously associated with the two CCs, but the RFIC 1 can provide a service for only one of the CCs at a same moment, a radio frequency conflict occurs between the two CCs. When the network simultaneously schedules data on the two CCs, the terminal device can receive the data only on one of the CCs, and a large quantity of bit errors are generated during reception on the other CC, which severely affects user experience.

Further, if the terminal device supports an intelligent SIM card switching function, to be specific, when a signal of the primary SIM card is poor, the terminal device can intelligently, quickly, and automatically switch to the secondary SIM card, and continue to send/receive a current data service on the secondary SIM card. If a capability of the secondary SIM card is updated in a mobile registration update manner, a delay is long, and user experience is unfavorable. If the primary SIM card reports a high capability (for example, four CCs) and the secondary SIM card reports a low capability (for example, one CC), the network can configure the maximum of one CC on the secondary SIM card. When the foregoing intelligent SIM card switching scenario occurs, a service rate of the secondary SIM card is limited. The service rate decreases rapidly, affecting user experience. To support a rapid increase in the service rate of the secondary SIM card in the SIM card switching scenario, dual-SIM card equivalence capability reporting needs to be supported, in other words, the terminal device reports a CA capability of supporting the maximum of four CCs to both the network corresponding to the primary SIM card and the network corresponding to the secondary SIM card. However, the network configures and manages carriers based on the capability reported by the terminal device. When the carriers simultaneously activated by the network on the dual SIM cards exceed an actual hardware capability, a baseband resource (for example, a processor resource and a storage resource) conflict may exist between the carriers of the dual SIM cards, and a radio frequency resource (for example, an RFIC channel resource) conflict may also exist. If the terminal device cannot perform normal reception on a carrier on which a hardware conflict occurs, a large quantity of bit errors are generated, affecting user experience. In addition, a larger quantity of carriers that are simultaneously activated by the network result in a higher probability of occurrence of a conflict and a greater impact on user experience.

Further, the terminal device that supports the dual SIM cards is used as an example. The terminal device supports multi-SIM-card or multi-service concurrency, for example, dual-SIM-card concurrency, enhanced mobile broadband (eMBB) and vehicle-to-everything (V2X) concurrency, eMBB and non-public network (NPN) concurrency, or eMBB and multicast broadcast service (MBS) concurrency. The dual-SIM-card concurrency means that the dual SIM cards simultaneously support receiving/sending a data service at a high service rate. In this scenario, the terminal device determines hardware resource allocation of the dual SIM cards based on service requirements, signal strength, and the like of the dual SIM cards. Therefore, in capability reporting, dual-SIM card equivalence capability reporting also needs to be supported. For example, the CA capability of supporting the four CCs is reported. Similarly, the network configures and manages the carriers based on the capability reported by the terminal device. When the carriers simultaneously activated by the network for the terminal device exceed the maximum capability supported by the terminal device, the baseband resource conflict and/or the radio frequency resource conflict may exist between the carriers of the dual SIM cards. The large quantity of bit errors are generated on the carrier on which the hardware conflict occurs. In addition, the larger quantity of carriers that are simultaneously activated by the network result in the higher probability of occurrence of the conflict and the greater impact on user experience.

In conclusion, it can be learned that, for a terminal device, for example, the terminal device that supports the dual SIM cards, a terminal device that supports both the eMBB and the V2X, a terminal device that supports both the eMBB and the NPN, or a terminal device that supports both the eMBB and the MBS, although a plurality of carriers are activated on the network side based on the capability of the terminal device, because the plurality of carriers share a hardware resource of the terminal device or the like, the terminal device cannot perform data transmission by using the carrier scheduled on the network side. If the network does not know that a carrier that can be supported by the terminal device is changed, the network continues to schedule data on the carrier. As a result, the terminal device may fail to correctly decode the data on the carrier, which wastes a carrier resource and severely deteriorates user experience.

In addition, when the terminal device is overheated (the temperature of the terminal device is excessively high), or when the terminal device is overcooled (the temperature of the terminal device is excessively low), or when radio frequency interference is generated between sending and receiving by the terminal device on a carrier frequency scheduled by the network device, or when IDC interference is generated between a carrier frequency that works in an eMBB cellular network and a carrier frequency that works in another radio access technology (for example, Wi-Fi or Bluetooth), or when the battery level of the terminal device is excessively low, the terminal device cannot perform data transmission by using the carrier scheduled on the network side.

Therefore, this application provides a method to resolve the foregoing problem. The following describes the method in detail. In addition, in embodiments of this application, a meaning of suppressing activation includes but is not limited to at least one of the following: requesting a network device to suspend or stop scheduling data on a carrier or a cell; suspending or stopping sending the data on a traffic channel; and deactivating the carrier or the cell. In embodiments of this application, suppressing activation may also be referred to as deactivation, or may be replaced with "deactivation". A terminal device that supports dual SIM cards may be briefly referred to as a "terminal device that supports dual cards", SIM cards are briefly referred to as "dual cards", and a single SIM card is briefly referred to as a "single card".

The network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

In embodiments of this application, interaction between a network device and a terminal device is used as an example for description. An operation performed by the network device may also be performed by a chip or module in the network device, and an operation performed by the terminal device may also be performed by a chip or module in the terminal device. The network device and the terminal device may communicate with each other by using a plurality of carriers, or may communicate with each other by using one carrier. The terminal device may further simultaneously communicate with a plurality of network devices. For example, the terminal device supports two SIM cards, the terminal device communicates with different network devices by using the two SIM cards, and the two SIM cards share a hardware resource of the terminal device. The hardware resource includes resources such as a baseband resource and a radio frequency resource. The baseband resource includes a processor resource, a memory resource, and the like. The radio frequency resource includes an antenna, a radio frequency front-end module (FEM), an RFIC channel, and the like.

Figure 7:
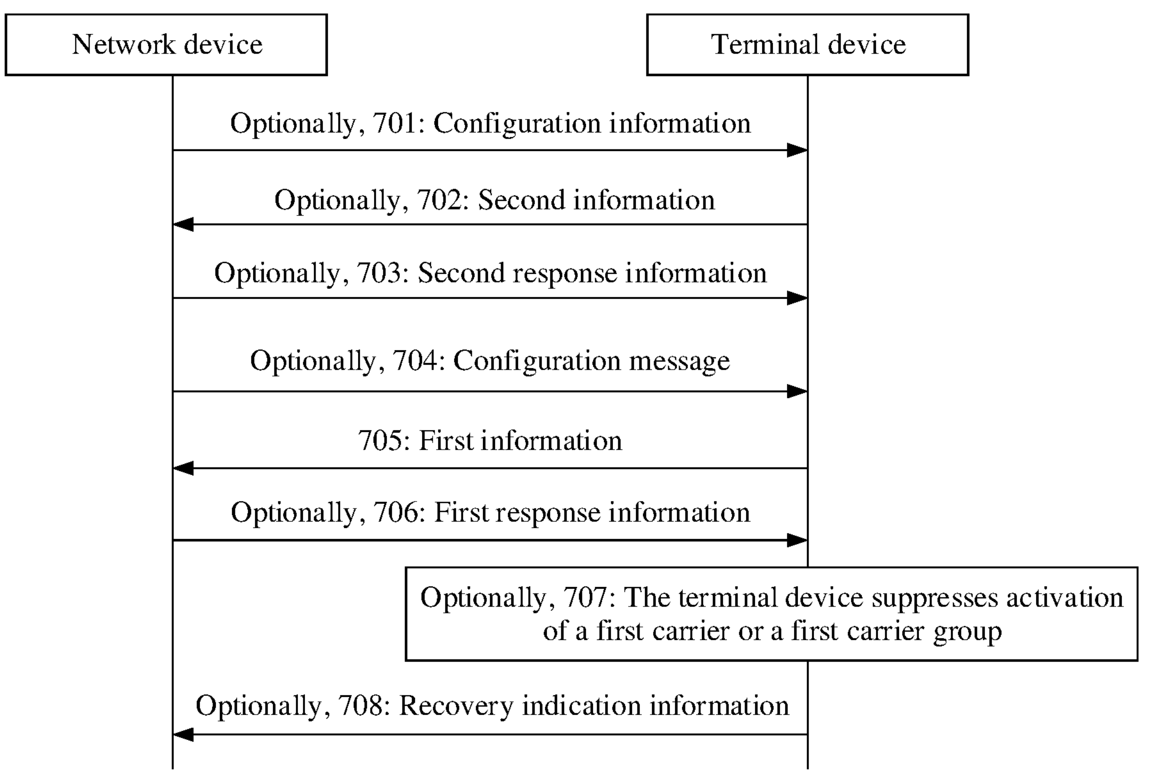
FIG. 7 is a schematic flowchart of a communication method according to an embodiment of this application.

With reference to the foregoing descriptions, FIG. 7 is a schematic flowchart of a communication method according to an embodiment of this application. Refer to FIG. 7. The method includes the following steps.

S701: A network device sends configuration information to a terminal device. Correspondingly, the terminal device receives the configuration information from the network device.

In a possible implementation, the configuration information may be used to configure at least one carrier for the terminal device. For example, a first carrier may be configured. A type of the first carrier is not limited, and the first carrier may be an FDD carrier or a TDD carrier. Alternatively, the first carrier may be an uplink carrier or a downlink carrier, or the first carrier may be an SUL carrier, or may be an SDL carrier. Alternatively, the first carrier may be an NUL carrier, or may be a normal downlink/non-supplementary downlink (NDL) carrier.

That the configuration information is used to configure at least one carrier for the terminal device may also be understood as follows: The network device configures the carrier for the terminal device by configuring a cell and a carrier frequency corresponding to the cell.

If the terminal device supports multi-carrier transmission, the network device may further configure a carrier such as a second carrier for the terminal device by using the configuration information, and/or the network device may further configure a first carrier group for the terminal device by using the configuration information. In a DC scenario, the network device may further configure a second carrier group for the terminal device by using the configuration information. The first carrier group may be a secondary carrier group and corresponds to a secondary cell group. Alternatively, the first carrier group may be a primary carrier group and corresponds to a master cell group.

In this embodiment of this application, one carrier group may include at least one carrier configured by the network device. In an implementation, a carrier that corresponds to a cell in a master cell group or a secondary cell group and that is configured by the network device may be referred to as a carrier group.

In another possible implementation, the configuration information may be further used to configure at least one cell for the terminal device. For example, at least one of a first cell, a second cell, a first cell group, and a second cell group may be configured.

One cell includes at least one carrier. For example, one FDD cell corresponds to a pair of carriers: one uplink FDD carrier and one downlink FDD carrier. One TDD cell corresponds to one TDD carrier. When the network device configures one cell group, the cell group may be a master cell group. When the network device configures two cell groups, the two cell groups include a master cell group and a secondary cell group.

The solution provided in this embodiment of this application may be applied to a scenario in which indication is performed by using a carrier as a granularity, or may be applied to a scenario in which indication is performed by using a cell as a granularity. When the solution is applied to the scenario in which indication is performed by using a carrier as a granularity, the network device may perform indication by using a carrier as a granularity. Correspondingly, the terminal device may also perform a request by using a carrier as a granularity. When the solution is applied to the scenario in which indication is performed by using a cell as a granularity, the network device may perform indication by using a cell as a granularity. Correspondingly, the terminal device may also perform a request by using a carrier as a cell.

For ease of description, in the following descriptions, an example in which this embodiment of this application is applied to the scenario with a carrier as a granularity is used for description. If this embodiment of this application is applied to the scenario with a cell as a granularity, "carrier" may be replaced with "cell". For example, a maximum quantity of activated carriers is replaced with a maximum quantity of activated cells. The details are not described one by one herein. When a cell is used as a granularity, an implementation method is the same. This method is also applied to, and details are not described again.

Optionally, S702: The terminal device sends second information to the network device. Correspondingly, the network device receives the second information from the terminal device.

In a possible implementation, in this embodiment of this application, the second information may be carried in a request message for the maximum quantity of activated carriers. The second information indicates the maximum quantity of activated carriers expected by the terminal device, and the maximum quantity of activated carriers is less than or equal to a quantity of configured carriers supported by the terminal device. The maximum quantity of activated carriers expected by the terminal device may also be understood as a quantity of carriers that can be activated for the terminal device. The quantity of configured carriers supported by the terminal device is determined based on a capability of the terminal device. For example, if the maximum quantity of configured carriers that is supported and indicated by the capability of the terminal device is 4, the maximum quantity of activated carriers indicated by the second information is less than or equal to 4.

In another possible implementation, the second information may be further used to indicate the maximum quantity of activated cells expected by the terminal device. In other words, in this embodiment of this application, the network device may perform indication by using a carrier as a granularity. Correspondingly, the terminal device may also perform a request by using a carrier as a granularity. Alternatively, the network device may perform indication by using a cell as a granularity. Correspondingly, the terminal device may also perform a request by using a carrier as a cell.

For ease of description, in this embodiment of this application, a carrier is mainly used as a granularity for description. When a cell is used as a granularity, an implementation method is the same. This method is also applied to, and details are not described again.

In the following descriptions, an example in which this embodiment of this application is applied to the scenario with a carrier as a granularity is mainly used for description. If this embodiment of this application is applied to the scenario with a cell as a granularity, "carrier" may be replaced with "cell". For example, the maximum quantity of activated carriers is replaced with the maximum quantity of activated cells. The details are not described one by one herein.

In this embodiment of this application, when the terminal device determines the maximum quantity of activated carriers, different radio access technologies (radio access technologies, RATs) correspond to a same maximum quantity of carriers that can be activated or different maximum quantities of carriers that can be activated. For example, a value of a maximum quantity of activated carriers of the terminal device in an LTE network and a value of a maximum quantity of activated carriers of the terminal device in an NR network may be the same or different. When the terminal device is in a non-standalone (NSA) networking network, for example, in dual connectivity using an (NG) EN-DC (eNB NR dual connection) and an NE-DC (NR eNB dual connection), the terminal device separately reports the maximum quantity of activated carriers in the LTE, the maximum quantity of activated carriers in the NR, and the maximum quantity of activated carriers in the LTE and the maximum quantity of activated carriers in the NR.

In this embodiment of this application, the second information may be RRC signaling, a MAC CE, or a physical layer message, or the second information may be UE assistance information. Alternatively, the second information may be carried in an RRC resume complete message, an RRC re-establishment request, or an RRC re-establishment complete message. An advantage of the method is that, in an RRC connection resume or RRC connection establishment process, the network device may learn of the maximum quantity of carriers that is supported by the terminal device and that can be activated, and the network device may perform RRC reconfiguration based on the maximum quantity of activated carriers reported by the terminal. In this RRC connection, communication is performed based on the maximum quantity of activated carriers expected by the terminal to ensure that a current service is not interrupted.

Alternatively, the second information may be used in an RRC connected mode. The terminal device semi-statically sends, to the network device by using RRC signaling or by using one MAC CE, the maximum quantity of activated carriers expected by the UE. When the terminal device has a service rate adjustment requirement, or due to signal quality, the terminal device may update the requested maximum quantity of activated carriers to the network device. An advantage of using the signaling or the MAC CE is that the quantity of carriers can be adjusted more quickly and a delay is lower.

Alternatively, the terminal device may send the second information to the network after the RRC connection is established, in other words, in the RRC connected mode. When the maximum quantity of activated carriers expected and supported by the terminal device changes, the terminal device may update the second information to the network, where the second information carries an updated maximum quantity of activated carriers.

In a possible implementation, in this embodiment of this application, the second information may be valid only in a time period. In other words, the maximum quantity of activated carriers or the maximum quantity of activated cells that is requested by using the second information is valid only in the time period. Therefore, valid duration or a valid condition of the maximum quantity of activated carriers or the maximum quantity of activated cells may be further agreed upon in advance, or the terminal device may indicate valid duration or a valid condition of the maximum quantity of activated carriers or the maximum quantity of activated cells to the network device (for example, the valid duration or the valid condition is indicated by using the second information). For example, the second information sent by the terminal device to the network device may further include at least one of the following:

first indication information, where the first indication information indicates the valid time of the maximum quantity of activated carriers. For example, the valid time is 10 milliseconds, 30 seconds, or 5 minutes, and the requested maximum quantity of activated carriers remains unchanged in the valid time. After the valid time expires, the quantity of carriers that are supported by the terminal device and that can be activated is equal to the quantity of configured carriers supported by the terminal device, and the quantity of configured carriers supported by the terminal device is determined based on the capability of the terminal device;

second indication information, where the second indication information indicates that the maximum quantity of activated carriers is valid in the current RRC connection to the network device. In other words, the requested maximum quantity of activated carriers remains unchanged until the network device indicates the terminal device to release the RRC connection, or the network device indicates to perform RRC connection reconfiguration, or the terminal device requests RRC connection reestablishment, or the terminal device requests RRC connection resume; and third indication information, where the third indication information indicates that the maximum quantity of activated carriers requested by the terminal device remains valid before the terminal device requests a new maximum quantity of activated carriers. In other words, the requested maximum quantity of activated carriers remains unchanged before the terminal device requests the new maximum quantity of activated carriers. The new maximum quantity of activated carriers may be the same as or may be different from the current maximum quantity of activated carriers.

It should be understood that, alternatively, a manner in which the second information defined by the foregoing three types of indication information is valid may be agreed upon in advance by the terminal device and the network device, or may be predefined in a standard.

Optionally, the second information may further include fourth indication information, where the fourth indication information indicates a reason or purpose for requesting the maximum quantity of activated carriers. The reason or purpose includes but is not limited to: overheating, for example, a temperature is greater than a first threshold; overcooling, for example, the temperature is less than a second threshold; an excessively low battery level; energy saving; hardware sharing which may alternatively be hardware resource sharing or hardware capability sharing; radio frequency interference; and IDC. The first threshold and the second threshold are determined based on an actual situation.

Optionally, S703: The network device sends second response information to the terminal device. The terminal device receives the second response information from the network device.

In this embodiment of this application, the second response information may be carried in a response message for the maximum quantity of activated carriers, or may be carried in another message. The second response information is used to respond to the second information.

The second response information indicates that the network device accepts or rejects a request for the maximum quantity of activated carriers of the terminal device, or the second response information indicates that the network device accepts or rejects a request for the maximum quantity of activated cells of the terminal device. A meaning of accepting the request for the maximum quantity of activated carriers of the terminal device means that a quantity of carriers simultaneously activated by the network device for the terminal device is less than or equal to the maximum quantity of activated carriers requested by the terminal device.

In this embodiment of this application, the second response information may indicate that a request for the second information is valid only in a time period. Therefore, the second response information may further indicate the time period in which the second information is valid. The second response information may directly indicate a valid time, or may indicate a valid condition instead of indicating the valid time. For example, the second response information may further indicate at least one piece of the following information: information 1, indicating the valid time of the maximum quantity of activated carriers. The valid time may indicate a time length, for example, 10 milliseconds, 30 seconds, or 5 minutes. A time length indicated by valid duration information may be equal to a time length indicated by the first indication information in the second information, or may not be equal to the time length indicated by the first indication information. This is not limited in this embodiment of this application. It may also be understood that when the second information includes the first indication information, in other words, when the terminal device indicates, in the second information, the valid time of the maximum quantity of activated carriers, the information 1 is used to confirm the first indication information of the terminal; information 2, indicating that the maximum quantity of activated carriers requested by the terminal device is valid in the current RRC connection to the network device. It may also be understood that when the second information includes the second indication information, in other words, when the terminal device indicates, in the second information, that the maximum quantity of activated carriers is valid in the current RRC connection to the network device, the information 2 is used to confirm the second indication information of the terminal; and information 3, indicating that the maximum quantity of activated carriers requested by the terminal device remains valid before the terminal device requests the new maximum quantity of activated carriers. It may also be understood that when the second information includes the third indication information, in other words, when the terminal device indicates, in the second information, that the maximum quantity of activated carriers requested by the terminal device remains valid before the terminal device requests the new maximum quantity of activated carriers, the information 3 is used to confirm the third indication information of the terminal.

In a possible implementation, if the second information indicates the valid time or the valid condition of the second information, and the second response information also indicates the valid time or the valid condition of the second information, the valid time or the valid condition indicated by the second response information may be preferentially used. For example, the valid time indicated by the second information is 10 minutes, and the second response information indicates that the maximum quantity of activated carriers is valid in the current RRC connection to the network device, an indication indicated by the second response information may be preferentially used. Certainly, it is not excluded that the valid time or the valid condition indicated by the second information is preferentially used.

When the maximum quantity of activated carriers is valid, the network device or the terminal device may have the following behavior:

A quantity of carriers activated by the network device for the terminal device is less than or equal to the maximum quantity of activated carriers; and/or the terminal device no longer sends the second information to the network device.

For example, when the terminal device receives the second response information, the terminal device starts a timer, where timing duration of the timer is the time length indicated by the valid duration information. In the timing period of the timer, the terminal device cannot send the request message for the maximum quantity of activated carriers, in other words, cannot request the new maximum quantity of activated carriers. The terminal device can send a request message for the maximum quantity of activated carriers again only after the timer expires. Optionally, in the timing period of the timer, when a radio link failure (radio link failure, RLF) occurs, the timer stops timing, and the terminal device restarts the timer after completing RRC reestablishment. According to this method, the terminal device can be prevented from frequently sending requests for the maximum quantity of activated carriers to the network, thereby reducing network-side scheduling complexity.

In this embodiment of this application, the second response information may be carried in RRC signaling, a MAC CE, or a physical layer message. Optionally, the second response information may alternatively be carried in an RRC reconfiguration message. Specifically, after receiving the request message for the maximum quantity of activated carriers of the terminal device, the network device sends the RRC reconfiguration message to the terminal device, where the RRC reconfiguration message includes an information element of the second response information. An advantage of carrying the second response information as an information element in the RRC reconfiguration message is that if the terminal device sends the second information to the network when the RRC connection is resumed or established, for example, sends the second information to the network by using the RRC resume complete message, the network may follow a procedure in the conventional technology, and respond to the second information by using the RRC reconfiguration message. On one hand, when the RRC connection is established, the network can perform RRC reconfiguration based on the maximum quantity of activated carriers expected by the UE, thereby avoiding service interruption and ensuring user experience. On the other hand, because existing signaling and procedure are reused, air interface signaling overheads are reduced.

S702 and S703 are used, so that the terminal device can indicate, to the network device, the maximum quantity of activated carriers or the maximum quantity of activated cells configured for the network device. In this way, the network device can determine a current capability of the terminal device, and does not configure, for the terminal device, the quantity of activated carriers or a quantity of activated cells indicated by the terminal device. This embodiment of this application may be further applied to configuration of another parameter required by the terminal device for communication, for example, a maximum aggregated bandwidth. Therefore, S702 and S703 may further be applied to one or more of the following parameters: UE assistance information, the maximum aggregated bandwidth, a maximum quantity of multiple-input multiple-output (MIMO) layers, discontinuous reception (DRX) parameter configuration, a minimum scheduling offset parameter for cross-slot scheduling, in-device coexistence (IDC) assistance information, sidelink communication assistance information, overheating assistance information, and energy saving assistance information.

The UE assistance information indicates, to the network device, a configuration parameter expected by the terminal device, and is used for UE energy saving/overheating/IDC interference. After the network device configures the UE assistance information for a corresponding purpose that is allowed to be reported by the UE, the UE assistance information is sent to the network device when the overheating/IDC interference/UE energy saving occurs, where the UE assistance information carries the corresponding parameter. The maximum aggregated bandwidth, the maximum quantity of MIMO layers, and the overheating assistance information may be used in an overheating scenario. The maximum aggregated bandwidth, the maximum quantity of MIMO layers, the DRX parameter, the minimum scheduling offset for cross-slot scheduling, and the energy saving assistance information may be used in a UE energy saving scenario. The IDC assistance information is used to resolve the IDC interference, and may carry information such as a carrier frequency, an interference type, and an interfered object of the IDC interference.

For a specific process in which the terminal device indicates the parameters such as the UE assistance information, the maximum aggregated bandwidth, and the maximum quantity of MIMO layers to the network device, and receives a response message from the network, refer to the descriptions in S702 and S703.

Optionally, S704: The network device sends a configuration message to the terminal device. The terminal device receives the configuration message from the network device.

The configuration message may be used to configure at least one of whether the terminal device is allowed to request to suppress activation of a carrier or carrier group, the terminal device is allowed to request to suppress activation of a quantity of carriers, and the terminal device is allowed to request to suppress activation of specific carriers. For example, the configuration message may indicate at least one of the following:

1. The terminal device is allowed to request to suppress activation of the quantity of carriers. Optionally, the carrier herein may be a secondary carrier.

2. The terminal device is allowed to request to suppress activation of a quantity of uplink carriers and/or a quantity of downlink carriers, where the uplink carrier may be an SUL carrier or an NUL carrier, and the downlink carrier is an SDL carrier or an NDL carrier. Both the uplink carrier and the downlink carrier herein may be secondary carriers.

3. The terminal device is allowed to request to suppress activation of a quantity of secondary cells.

4. The terminal device is allowed to request to suppress activation of at least one carrier or carrier group. That suppression of activation of which carriers in carriers configured for the terminal device may be requested may specifically be indicated. Optionally, the carrier herein may be a secondary carrier.

5. The terminal device is allowed to request to suppress activation of the carrier group. Optionally, the carrier group herein may be a secondary carrier group.

6. The terminal device is allowed to request to suppress activation of at least one cell. That suppression of activation of which cells in cells configured for the terminal device may be requested may specifically be indicated. Optionally, the cell herein may be a secondary cell.

7. The terminal device is allowed to request to suppress activation of a cell group. Optionally, the cell group herein may be a secondary cell group.

8. The terminal device is allowed or disallowed to request to suppress activation of the first carrier. If the network device configures another carrier, whether to allow a request for suppressing activation of the another carrier may further be indicated. Details are not described herein again.

9. The terminal device is allowed or disallowed to request to suppress activation of an uplink carrier or downlink carrier configured by the network device. Optionally, the uplink carrier is an SUL carrier or an NUL carrier, and the downlink carrier is an SDL carrier or an NDL carrier.

10. The terminal device is allowed or disallowed to request to suppress activation of the first cell, where the first cell corresponds to the first carrier. If the first cell corresponds to a plurality of carriers, whether to allow a request for suppressing activation of a downlink carrier and/or an uplink carrier in the first cell may further be indicated. If the network device configures another cell, whether to allow a request for suppressing activation of the another cell may further be indicated. Details are not described herein again.

11. The terminal device is allowed or disallowed to request to suppress activation of the carrier group, where the carrier group herein corresponds to a cell group.

12. The terminal device is allowed or disallowed to request to suppress activation of the cell group, where the cell group herein may be a secondary cell group, and the first cell group corresponds to the first carrier group.

13. The terminal device is allowed or disallowed to request to suppress activation of the carrier, where the carrier herein may be a secondary carrier. It may be understood that the network controls enabling/disabling of a carrier activation suppression mechanism.

14. The terminal device is allowed or disallowed to request to suppress activation of a cell, where the cell herein may be a secondary cell. It may be understood that the network controls enabling/disabling of a cell activation suppression mechanism.

The network device may send the configuration message to the terminal device by using RRC signaling or a MAC CE.

For example, when the network device indicates whether the terminal device is allowed to request to suppress activation of a specific cell (including an uplink carrier and a downlink carrier of the cell), the configuration message may be sent by using an 8-bit MAC CE, and the MAC CE may be shown in FIG. 5(*a*). In this case, the network device indicates whether the terminal device is allowed to actively request to suppress activation of at most seven SCells, and indexes of the seven SCells are respectively 1 to 7. In the MAC CE, the first (leftmost) bit may indicate whether a request for suppressing activation of an SCell whose index is 1 is allowed, the second bit may indicate whether a request for suppressing activation of an SCell whose index is 2 is allowed, and other cases may be deduced by analogy. When a value of a bit is 1 (or 0), it indicates that a request for suppressing activation of an SCell corresponding to the bit is allowed. When a value of a bit is 0 (or 1), it indicates that a request for suppressing activation of an SCell corresponding to the bit is disallowed. Optionally, the eighth bit in the MAC CE is a reserved bit, and is always set to 0. Alternatively, the eighth bit in the MAC CE indicates a state of a PSCell or an SCG. When the bit is set to 1, it indicates that the terminal device is allowed to actively request to suppress activation of the PSCell or the SCG. When the bit is set to 0, it indicates that the terminal device is disallowed to actively request to suppress activation of the PSCell or the SCG. The foregoing is merely an example. An association relationship between locations and a sequence of bits in the MAC CE and an SCell/PSCell is not limited, and a length of the bitmap (bitmap) is not limited either. Alternatively, as shown in FIG. 5(*b*), the MAC CE may include 32 bits, which may indicate states of 31 SCells and one PSCell/SCG.

S705: The terminal device sends first information to the network device. The network device receives the first information from the terminal device.

It should be noted that a sequence of performing S703 and S704 and S705 is not limited in this application. S703 and S704 may be performed before or after S705.

In this embodiment of this application, an activation suppression request message may carry the first information, where the first information is used to request to suppress activation of the first carrier or the first carrier group, and the first carrier group may correspond to the first cell group. Alternatively, the first information may be used to request to suppress activation of the first cell or the first cell group, where the first cell group may be a secondary cell group. Alternatively, the first information may be used to request to suppress activation of another carrier or cell, for example, the second carrier. In this embodiment of this application, the first carrier, the first carrier group, the first cell, and the first cell group are used as examples for description. Other cases may be deduced by analogy, and details are not described again. In this embodiment of this application, the first information may be used to request to suppress activation of a plurality of carriers. Specifically, the first information may further include request information for suppressing activation of the second carrier. The second carrier is different from the first carrier. Whether the first carrier and the second carrier belong to a same carrier group is not limited in this application. In other words, activated states of the plurality of carriers may be simultaneously requested by using one piece of first information, thereby improving communication efficiency.

If the terminal device receives the configuration message, and the configuration message indicates that the terminal device is allowed to request to suppress activation of the at least one carrier, the first carrier is one of the at least one carrier that is indicated by the configuration message and for which a request for suppressing activation is allowed. When the configuration message indicates that the terminal device is allowed to request to suppress activation of the at least one cell, the first cell is one of the at least one cell that is indicated by the configuration message and for which a request for suppressing activation is allowed.

Correspondingly, only when the configuration message indicates that the terminal device is allowed to request to suppress activation of the first carrier group, the first information can be used to request to suppress activation of the first carrier group, and when the configuration message indicates that the terminal device is disallowed to request to suppress activation of the first carrier group, the first information is not used to request to suppress activation of the first carrier group. Only when the configuration message indicates that the terminal device is allowed to request to suppress activation of the first cell group, the first information can be used to request to suppress activation of the first cell group, and when the configuration message indicates that the terminal device is disallowed to request to suppress activation of the first cell group, the first information is not used to request to suppress activation of the first cell group.

In addition, if the current first carrier or first carrier group is in the activated state, the first information is used to request to suppress activation of the first carrier or the first carrier group, and may indicate a request for deactivating the first carrier or the first carrier group or may indicate a request for not activating the first carrier or the first carrier group (or remaining the activated state). However, the network device pauses or stops scheduling data on the first carrier or the first carrier group, or pauses or stops sending data on a traffic channel of the first carrier or the first carrier group.

If the first carrier or the first carrier group is in a deactivated state, the first information is used to request to suppress activation of the first carrier or the first carrier group, and may indicate a request for keeping the deactivated state of the first carrier or the first carrier group, or a request for not activating the first carrier or the first carrier group.

In this embodiment of this application, the first information may be sent to the network device by using RRC signaling, a MAC CE, or a physical layer message. When the first information is a MAC CE, a logical channel identifier of a logical channel for sending the MAC CE is different from a logical channel identifier of an SCell activation/deactivation MAC CE.

When the first information is used to request to suppress activation of the first carrier, if the first carrier is a carrier in an FDD cell, namely, an FDD carrier, the FDD cell includes an uplink carrier and a downlink carrier, and the first carrier may be a downlink carrier or may be an uplink carrier. If the first carrier is a carrier in a TDD cell, namely, a TDD carrier, the carrier included in the TDD cell may be separately used for transmission in an uplink direction and transmission in a downlink direction in a time division manner. In this case, the first information may be used to request to suppress activation of a downlink direction and an uplink direction of the first carrier, or indicate to request to suppress activation of only the downlink direction or the uplink direction of the first carrier.

Similarly, when a carrier in the first carrier group is an FDD carrier, the first information may be used to request to suppress activation of an uplink carrier or a downlink carrier in the first carrier group, or may be used to request to suppress activation of the uplink carrier and the downlink carrier in the first carrier group. When a carrier in the first carrier group is a TDD carrier, the first information may be used to request to suppress activation of a downlink direction of the first carrier group, and/or request to suppress activation of an uplink direction of the first carrier group.

In an implementation, when the first information is used to request to suppress activation of the first cell, the first information may be used to request to suppress activation of all carriers associated with the first cell, or request to suppress activation of all directions of all the carriers associated with the first cell. For example, the first cell is an FDD cell. In this case, the first information may be used to request to suppress activation of an uplink carrier and a downlink carrier in the first cell. For example, the first cell is a TDD cell. In this case, the first information may be used to request to suppress activation of an uplink direction and a downlink direction of a carrier in the first cell. In another implementation, the first information may be used to request to suppress activation of a specific carrier or a specific direction associated with the first cell. The specific carrier may be at least one of an NUL carrier, an SUL carrier, an NDL carrier, and an SDL carrier, and the specific direction may be an uplink direction or a downlink direction. For example, if the first cell is the FDD cell, when the first cell is associated with only one downlink carrier and one corresponding uplink carrier, suppression of activation of the downlink carrier and/or the corresponding uplink carrier may be requested. When the cell includes a plurality of carriers in an uplink direction, for example, when an uplink includes one NUL carrier and one SUL carrier, one bit may indicate that uplink carriers and/or an uplink carrier whose activation is requested to be suppressed are/is the SUL carrier and/or the NUL carrier. For example, when the bit is set to 0, it indicates a request for suppressing both activation of the NUL carrier and activation of the SUL carrier. When the bit is set to 1, it indicates a request for suppressing only activation of the SUL carrier. When the first cell is associated with more than two uplink carriers in the uplink direction, the terminal device may request, based on identifiers of a plurality of uplink carriers configured by the network, suppression of activation on a specific uplink carrier associated with the cell. For example, the uplink carriers are indicated by using a bitmap, where each bit in the bitmap corresponds to one uplink carrier. When one bit is set to 0, it indicates that suppression of activation of a corresponding carrier is requested. When one bit is set to 1, it indicates that suppression of activation of a corresponding carrier is removed.

Similarly, when the first information is used to request to suppress activation of the first cell group, in an implementation, the first information may be used to request to suppress activation of all carriers associated with the first cell group, to be specific, suppress activation of an uplink carrier and a downlink carrier in the first cell group. Alternatively, the first information may be used to request to suppress activation of all directions of all the carriers associated with the first cell, to be specific, suppress activation of an uplink direction and a downlink direction of a cell in the first cell group. In another implementation, the first information may be used to request to suppress activation of a specific carrier or a specific direction associated with the first cell group.

With reference to the foregoing descriptions, for example, the first information is an 8-bit MAC CE. The MAC CE may be shown in FIG. 5(*a*), and the MAC CE may include eight bits.

In a possible implementation, when the first information is used to request to suppress activation of a plurality of SCells including the first cell, or when the first information is used to request to suppress activation of a cell group including a plurality of SCells, one bit in the MAC CE corresponds to one SCell. The eighth bit in the MAC CE is a reserved (reserved, R) bit. In this case, the first information indicates that activation of seven SCells is suppressed, and indexes of the seven SCells are respectively 1 to 7. In the MAC CE, the first (leftmost) bit may indicate that activation of an SCell whose index is 1 is requested to be suppressed, the second bit may indicate that activation of an SCell whose index is 2 is requested to be suppressed, and other cases may be deduced by analogy. The foregoing is merely an example. An association relationship between locations and a sequence of bits in the MAC CE and an SCell/PSCell is not limited, and a length of the bitmap is not limited either. Alternatively, as shown in FIG. 5(*b*), the MAC CE may include 32 bits, and activation of 31 SCells may be requested to be suppressed, or activation of 31 SCells in a cell group may be requested to be suppressed.

In the foregoing example, when a value of a bit is 1 (or 0), it indicates that the terminal device requests to suppress activation of carriers in a SCell corresponding to the bit, including an uplink carrier and a downlink carrier of the SCell. A meaning of requesting to suppress activation of the SCell may include: when the SCell is in an activated state (optionally, the SCell may alternatively be in a dormant state), requesting to deactivate the SCell; or when the SCell is in a deactivated state, requesting to keep the deactivated state of the SCell unchanged or requesting the network to suspend activating the SCell. Correspondingly, when a value of a bit is 0 (or 1), it indicates that a SCell corresponding to the bit can be activated by the network device, or it indicates that suppression of activation of the SCell is removed, or an activatable state of the SCell is not affected on a terminal device side. The activated/deactivated state of the SCell is completely controlled by the network device.

Optionally, the eighth bit in the MAC CE is a reserved bit, and may be always set to 0. Alternatively, the eighth bit in the MAC CE indicates a state of the PSCell or an SCG, and setting the eighth bit in the MAC CE to 1 (or setting the eighth bit in the MAC CE to 0) indicates that the terminal device actively requests to deactivate the PSCell or the SCG. Setting the eighth bit in the MAC CE to 0 (or setting the eighth bit in the MAC CE to 1) indicates that the terminal device does not change an activated state of the PSCell or the SCG. Similarly, one MAC CE whose length is 16 bits may be used to separately indicate activatable states of uplink carriers and downlink carriers of the seven SCells and one PSCell. Details are not described again.

In another possible implementation, when the first information is used to request to suppress activation of the plurality of carriers including the first carrier, or when the first information is used to request to suppress activation of a carrier group including a plurality of carriers, one bit in the MAC CE corresponds to one carrier. The eighth bit in the MAC CE is a reserved bit. In this case, the first information indicates that activation of at most seven carriers is suppressed. An association relationship between locations and a sequence of bits in the MAC CE and a carrier is not limited, and a length of the foregoing bitmap is not limited either. Alternatively, as shown in FIG. 5(*b*), the MAC CE may include 32 bits, and activation of 31 carriers may be requested to be suppressed, or activation of 31 carriers in a carrier group may be requested to be suppressed.

In the foregoing example, when a value of a bit is 1 (or 0), it indicates that the terminal device requests to suppress activation of a carrier corresponding to the bit. When the carrier is in an activated state (optionally, the carrier may alternatively be in a dormant state), requesting to suppress activation of the carrier means requesting to deactivate the carrier. When the carrier is in a deactivated state, requesting to suppress activation of the carrier means requesting to keep the deactivated state of the carrier unchanged, or requesting the network to suspend activation of the carrier. Correspondingly, when a value of a bit is 0 (or 1), it indicates that a carrier corresponding to the bit can be activated by the network device, or it indicates that suppression of activation of the carrier is removed, or an activatable state of the carrier is not affected on a terminal device side. The activated/deactivated state of the carrier is completely controlled by the network device.

In this embodiment of this application, when the first information is used to request to suppress activation of the first carrier or the first carrier group, the first information may include an identifier of the carrier or carrier group whose activation is requested to be suppressed. For example, the first information includes an identifier of the first carrier or an identifier of the first carrier group.

When the first information is used to request to suppress activation of the first cell or the first cell group, the first information may include an identifier of the first cell or an identifier of the first cell group. The identifier of the first cell may be, for example, a serving cell sequence number, for example, a cell identifier configured by using a serving cell index (ServCellIndex). In identifiers configured by using serving cell indexes, an identifier 0 is used to identify a PCell, and a value of SCell index is an identifier assigned to a SCell (For example, if a maximum of seven SCells are configured, values of SCell indexes range from 1 to 7).

In this embodiment of this application, when the first information is used to request to suppress deactivation, the first information can be valid only in a time period. In other words, suppression of activation of the first carrier or the first carrier group or the first cell or the first cell group requested by using the first information is kept only in the time period. Therefore, the first information may further indicate a valid time period. The first information may directly indicate a valid time, or may not indicate a valid time, but indicate a valid condition. For example, the first information may further indicate at least one of the following:

1: indicate a valid time for suppressing activation of the first carrier or the first carrier group, or the first information indicates a valid time for suppressing activation of the first cell or the first cell group. The valid time may be 10 milliseconds, 30 seconds, 5 minutes, or the like, and a specific value is not limited;

2: indicate that a state in which suppression of activation of the first carrier or the first carrier group is valid in a current radio resource control connection to the network device, or a state in which suppression of activation of the first cell or the first cell group is valid in a current radio resource control connection to the network device. In other words, suppressing activation of the first carrier or the first carrier group or the first cell or the first cell group remains unchanged until the network device indicates the terminal device to release the RRC connection, or the network device indicates to perform RRC connection reconfiguration, or the terminal device requests RRC connection reestablishment, or the terminal device requests RRC connection resume; and 3: indicate that the first information is valid before the terminal device sends recovery indication information. That the first information is valid may be understood as follows: The terminal device keeps the state in which carrier suppression of the first carrier or the first carrier group or the first cell or the first cell group is requested until the terminal device sends the recovery indication information. The recovery indication information is used to request to recover an activatable state of the first carrier or the first carrier group or the first cell or the first cell group to be activated, or indicate that suppression of activation of the first carrier or the first carrier group or the first cell or the first cell group is removed, or indicate that the first information is invalid.

In a possible implementation, the first information may further be used to request to suppress an SUL characteristic at a specified moment or in a specified time period. Suppressing the SUL characteristic may mean that both an SUL carrier and an NUL carrier are not activated for the terminal device, or both the NUL carrier and the SUL carrier are not scheduled for the terminal device. For example, the first information may be used to request to activate or schedule only at most one carrier in the SUL carrier and the NUL carrier in the first carrier group. Alternatively, the first information may be used to request to activate or schedule only the SUL carrier in the first carrier group, or request to activate or schedule only the NUL carrier in the first carrier group. For another example, the first information may further be used to request to activate or schedule only at most one carrier in the SUL carrier and the NUL carrier in the first cell group. Alternatively, the first information may be used to request to activate or schedule only the SUL carrier in the first cell group, or request to activate or schedule only the NUL carrier in the first cell group.

In a possible implementation, the terminal device may further request, by using the first information, to send a reference signal to the network device on the first carrier or the first carrier group whose activation is requested to be suppressed, or request to reserve a configuration of a reference signal on the first carrier or the first carrier group, or indicate, to the network device, the terminal device to reserve a capability of sending a reference signal on the first carrier or the first carrier group, or indicate, to the network device, the terminal device to keep sending a reference signal on the reference signal based on a network configuration. The reference signal may be a reference signal such as a sounding reference signal (sounding reference signal, SRS).

Similarly, on a carrier in the first cell or the first cell group whose activation is requested to be suppressed, a reference signal is requested to be sent to the network device according to a reference signal configuration. For details, refer to the descriptions in the foregoing paragraph.

In a possible implementation, in capability information of the terminal device, the terminal device reports to the network that the terminal device supports only deactivation or deletion of a traffic channel such as a physical uplink shared channel (PUSCH) on a specific carrier, for example, the SUL carrier. However, sending of the reference signal is reserved on the carrier.

A purpose that the terminal device requests to suppress activation of a carrier or delete only a traffic channel of the carrier, but keeps sending a reference signal on the carrier is that when the terminal device expects the network to stop scheduling data transmission on the carrier due to excessively high power consumption or due to a change of a service requirement, for example, stop scheduling the SUL carrier to reduce the energy consumption of the terminal device, but keeps sending the reference signal on the carrier, it can be ensured that the network correctly measures channel quality of the carrier, to correctly obtain the channel quality of the carrier and quickly activate the carrier when a high service rate is required.

In addition, in this embodiment of this application, the terminal device may send the first information in a plurality of cases. For example, the terminal device sends the first information when a CA combination expected by the terminal device changes. When any one of the following conditions is met, the CA combination expected by the terminal device changes:

The quantity of carriers activated by the network device is greater than the maximum quantity of activated carriers expected by the terminal device, where the maximum quantity of activated carriers may be the maximum quantity of activated carriers requested by the terminal device by using the second information.

The first carrier and the second carrier that are configured by the network device share a hardware resource on the terminal device. For example, an RFIC channel corresponding to the first carrier is the same as an RFIC channel corresponding to the second carrier.

The terminal device has a conflict or potential conflict between transmission on the first carrier and the second carrier that are configured by the network device. It may also be understood that the terminal device cannot simultaneously work on the first carrier and the second carrier. For example, the network device activates the first carrier and the second carrier, and simultaneously sends or schedules data on the first carrier and the second carrier, but the terminal device cannot simultaneously transmit data on the first carrier and the second carrier, including receiving downlink data and/or sending uplink data. For another example, the network configures the first carrier and the second carrier, but activates only one carrier and does not activate the other carrier. However, due to a hardware design of the terminal device, the first carrier and the second carrier use the same hardware resource. For example, the RFIC channel corresponding to the first carrier is the same as the RFIC channel corresponding to the second carrier. In this case, when the network simultaneously activates the two carriers, a transmission conflict occurs. The temperature of the terminal device is overheated, for example, the temperature is greater than the first threshold.

The temperature of the terminal device is overcooled, for example, the temperature is less than the second threshold.

The battery level of the terminal device is excessively low.

The terminal device is in an energy-saving mode.

The terminal device has radio frequency interference between the first carrier and the second carrier.

In a possible implementation, the first information may indicate a reason or purpose for requesting suppression of activation. The reason or purpose includes but is not limited to: overheating, for example, the temperature of the terminal device is greater than the first threshold; supercooling, for example, the temperature of the terminal device is less than the second threshold; a low battery level; energy saving; hardware sharing which may alternatively be hardware resource sharing or hardware capability sharing; radio frequency interference, and IDC.

Optionally, S706: The network device sends first response information to the terminal device. The terminal device receives the first response information from the network device.

In this embodiment of this application, the first response information may be carried in an activation suppression response message, or may be carried in another message.

Optionally, S707: The terminal device suppresses activation of the first carrier or the first carrier group.

Alternatively, when the terminal device requests to suppress activation of the first cell or the first cell group, the terminal device may suppress activation of the first cell or the first cell group.

In a first implementation, the terminal device may suppress activation of the first carrier or the first carrier group or the first cell or the first cell group.

In a second implementation, if the terminal device does not receive the first response information from the network device in first duration after the first information is sent, the terminal device suppresses activation of the first carrier or the first carrier group or the first cell or the first cell group.

For example, when the terminal device sends the activation suppression request message (when the activation suppression request message is sent or after the activation suppression request message is sent), a timer is started, where timing duration of the timer is the first duration. In the duration of the timer, the terminal device expects to receive the first response information from the network device. If the terminal device receives, in a running period of the timer, the first response information sent by the network device, the timer stops. If the first response information is not received when the timer expires, the terminal device actively suppresses activation of the first carrier or the first carrier group or the first cell or the first cell group after the timer expires. The first duration of the timer may be configured by the network device, or may be independently determined by the terminal device.

In this embodiment of this application, the first response is used to accept a request for suppressing activation of the first carrier or the first carrier group or the first cell or the first cell group or reject a request for suppressing activation of the first carrier or the first carrier group or the first cell or the first cell group. A meaning of accepting includes that the network device performs, according to the request of the terminal device, suppression of activation of the first carrier or the first carrier group or the first cell or the first cell group.

Meanings of rejecting include: (1) The network device rejects, according to the request of the terminal device, suppression of activation of the first carrier or the first carrier group or the first cell or the first cell group; and (2) the network device activates the first carrier or the first carrier group or the first cell or the first cell group whose activation suppression is requested by the terminal device.

In addition, in this embodiment of this application, the first response information may be carried in RRC signaling or a MAC CE, or the first response information may be an SCell activation/deactivation MAC CE.

In this embodiment of this application, the first response information may indicate that the request for the first information is valid only in a time period. Therefore, the first response information may further indicate the time period in which the first information is valid. The first response information may directly indicate a valid time, or may indicate a valid condition instead of indicating the valid time. For example, the first response information may further indicate at least one piece of the following information:

- the valid time, where the valid time may be 10 milliseconds, 30 seconds, 5 minutes, or the like, and a specific value is not limited. It may also be understood that when the terminal device indicates the valid time of the maximum quantity of activated carriers in the first information, this information is used to confirm the valid time indicated by the terminal. The network device keeps the first carrier or the first carrier group or the first cell or the first cell group in the deactivated state or not being activated in the valid time. In the valid time, the terminal device can no longer send the first information. Optionally, after receiving the first response information, the terminal device starts the timer, where the duration of the timer is a valid time in the first response information. In the timing period of the timer, the terminal device cannot send the first information. The terminal device can send first information again only after the timer expires. Optionally, when the radio link failure occurs, the timer stops timing, and the terminal device restarts the timer after completing RRC reestablishment. According to this method, the terminal device can be prevented from frequently sending activation suppression requests to the network, thereby reducing network-side scheduling complexity.

Indicating that a state in which suppression of activation of the first carrier or the first carrier group is valid in a current radio resource control connection to the network device, or a state in which suppression of activation of the first cell or the first cell group is valid in a current radio resource control connection to the network device may also be understood as follows: When the terminal device indicates, in the second information, that the state in which suppression of activation of the first carrier or the first carrier group is valid in the current RRC connection to the network device, or the state in which suppression of activation of the first cell or the first cell group is valid in the current RRC connection to the network device, this information is used to confirm the foregoing indication of the terminal device. That a state in which suppression of activation of the first carrier or the first carrier group is valid in a current radio resource control connection to the network device, or a state in which suppression of activation of the first cell or the first cell group is valid in a current radio resource control connection to the network device may be understood as follows: The network device keeps suppression of activation of the first carrier or the first carrier group or the first cell or the first cell group unchanged until the network device indicates the terminal device to release the RRC connection, or the network device indicates to perform RRC connection reconfiguration, or the terminal device requests RRC connection reestablishment, or the terminal device requests RRC connection resume.

Indicating that the first information is valid before the terminal device sends recovery indication information may be understood as follows: The network device keeps carrier suppression of the first carrier or the first carrier group or the first cell or the first cell group based on the first information sent by the terminal device until the network device receives the recovery indication information. The recovery indication information is used to request to recover the first carrier or the first carrier group or the first cell or the first cell group.

It should be noted that if the first information indicates the valid time or a valid condition of the first information, and the first response information also indicates the valid time or the valid condition of the first information, the valid time or the valid condition indicated by the first response information may be preferentially used. For example, the valid time indicated by the first information is 10 minutes, and the valid time indicated by the first response information is 5 minutes. In this case, the 5 minutes indicated by the first response information may be preferentially used. Certainly, it is not excluded that the valid time or the valid condition indicated by the first information is preferentially used.

Optionally, S708: The terminal device sends the recovery indication information to the network device. The network device receives the recovery indication information from the terminal device.

In this embodiment of this application, the recovery indication information may also be referred to as third information. The third information indicates that suppression of activation of the first carrier or the first carrier group or the first cell or the first cell group is removed, or the third information indicates that the first information is invalid, or is used to request to recover the first carrier or the first carrier group or the first cell or the first cell group.

If the first carrier or the first carrier group or the first cell or the first cell group is activated, the network device suspends performing data scheduling on the first carrier or the first carrier group or the first cell or the first cell group because activation is suppressed. That the third information indicates that suppression of activation is removed or the first information is invalid may mean that data scheduling is resumed on the first carrier or the first carrier group. If the first carrier or the first carrier group or the first cell or the first cell group is deactivated, that the third information indicates that suppression of activation is disabled or the first information is invalid may mean that the first carrier or the first carrier group or the first cell or the first cell group can be activated.

The terminal device may send the recovery indication information to the network device after an actually supported CA capability is recovered. A meaning of the foregoing recovery includes but is not limited to: A hardware conflict of the terminal device is removed; an overcooling state is removed; an overheating state is removed; a low battery level state is removed; radio frequency interference is removed; an IDC problem is resolved; the terminal device recovers a maximum CA capability in capability reporting of the terminal device; and the first carrier or the first carrier group or the first cell or the first cell group whose activation is requested to be suppressed by the terminal device is recovered to be activated.

The third information may be carried in RRC signaling, a MAC CE, or physical layer signaling. This is not limited in this embodiment of this application.

Optionally, the third information is indicated by using a bit status, and indicates, to the network device, that the first carrier or the first carrier group or the first cell or the first cell group whose activation is requested to be suppressed is recovered to be activated.

Optionally, the third information indicates that the first carrier is recovered to be activated, and the first carrier is at least one carrier. Alternatively, the third information indicates that at least one uplink carrier and/or downlink carrier is recovered to be activated, and may explicitly indicate that the uplink carrier is an SUL carrier and/or an NUL carrier, or explicitly indicate that the downlink carrier is an SDL carrier and/or an NDL carrier. Alternatively, the third information indicates that the first cell is recovered to be activated, the first cell is at least one cell, and the first cell may be a secondary cell. Alternatively, the third information indicates that the first cell group is recovered to be activated, and the first cell group may be a secondary cell group.

When the third information is a MAC CE, a logical channel identifier (LCID) of a logical channel for sending the MAC CE is different from a logical channel identifier (LCID) of an SCell activation/deactivation MAC CE. Optionally, the MAC CE is a same MAC CE as a carrier suppression request message.

The third information and the first information may use MAC CEs in a same format. A format and a function of the MAC CE are described in detail in S705, and details are not described herein again.

According to the solution of this embodiment of this application, the terminal device can actively control, based on a scenario and a service requirement, a quantity of carriers that can be activated as required, and request to suppress activation of a specific carrier, to ensure that carriers simultaneously activated by the network do not exceed a current actual hardware capability of the terminal device, and ensure normal operation of the terminal device, thereby improving user experience.

For example, for a terminal device that supports dual cards, based on equivalence capability reporting, user experience can be met by using the solution in this embodiment of this application. For example, in intelligent card switching and multi-card concurrency scenarios, high service rates can be provided on both the SIM cards. In addition, a problem of a large quantity of bit errors that is caused when the hardware conflict (including the baseband conflict and the radio frequency conflict) occurs can be avoided because the terminal device cannot work normally on a plurality of activated carriers at the same time due to hardware capability sharing. For ease of description, the dual SIM cards are briefly referred to as "dual cards" and a single SIM card is briefly referred to as a "single card" in the following descriptions.

Specifically, on one hand, in this embodiment of this application, the terminal device actively requests the maximum quantity of activated carriers or the maximum quantity of activated cells, and obtains a response from the network. From a perspective of the terminal device side, it can be ensured that CA supported by the terminal device during actual working does not exceed a baseband capability of the terminal device. From a perspective of the network side, when the network schedules a carrier, the actual CA capability of the terminal device is not exceeded, so that a better and closer cooperation relationship is formed between the terminal device and the network. In addition, when reporting a high-specification capability, the terminal device semi-statically indicates the maximum quantity of activated carriers or the maximum quantity of activated cells to the network, so that a service requirement can be more quickly adapted, a delay is lower, service interruption caused by capability re-reporting is avoided, and user experience is ensured.

On the other hand, in this embodiment of this application, the terminal device actively requests to suppress activation of a specific carrier or cell, to effectively avoid a problem that the terminal device cannot correctly decode data scheduled on a carrier activated by the network due to the radio frequency conflict (for example, an RFIC channel conflict), thereby avoiding affecting quality of service and reducing user experience. In this embodiment of this application, the UE actively requests carrier suppression, so that a carrier activated by the network device does not exceed the actual hardware capability of the terminal device, thereby ensuring user experience. From a perspective of a terminal device hardware design, a specific band and a carrier are associated with a specific radio frequency channel. Compared with the network side, only the terminal device can understand an internal hardware design manner of the terminal device, for example, the terminal device that supports the dual cards or a terminal device shared by eMBB and V2X, or only the terminal device can determine a specific carrier on which the hardware conflict occurs, and deactivate the specific carrier accordingly. When the internal hardware conflict of the terminal device is removed, the terminal device may indicate to remove carrier suppression to the network device and recover the activatable state of the carrier. If only the network controls carrier deactivation, the network cannot know which carrier has the hardware conflict, and therefore the network may deactivate an improper carrier. This not only cannot resolve the hardware conflict problem of the terminal device, but also causes a CA capability decrease and a network capacity loss. If the network still schedules data on a conflicting carrier, a large quantity of bit errors may occur. In addition, in this embodiment of this application, considering a requirement of the network side for load balancing, to balance network load and requirements of the terminal device for costs and power consumption, in this embodiment of this application, a carrier suppression configuration is delivered by the network, and the quantity of carriers that the terminal device is allowed to actively request to deactivate is configured, or whether the terminal device is allowed to deactivate a specific carrier, so that carrier deactivation behavior of the terminal device is controlled by the network, and the network and the terminal device can cooperate better.

Figure 8:
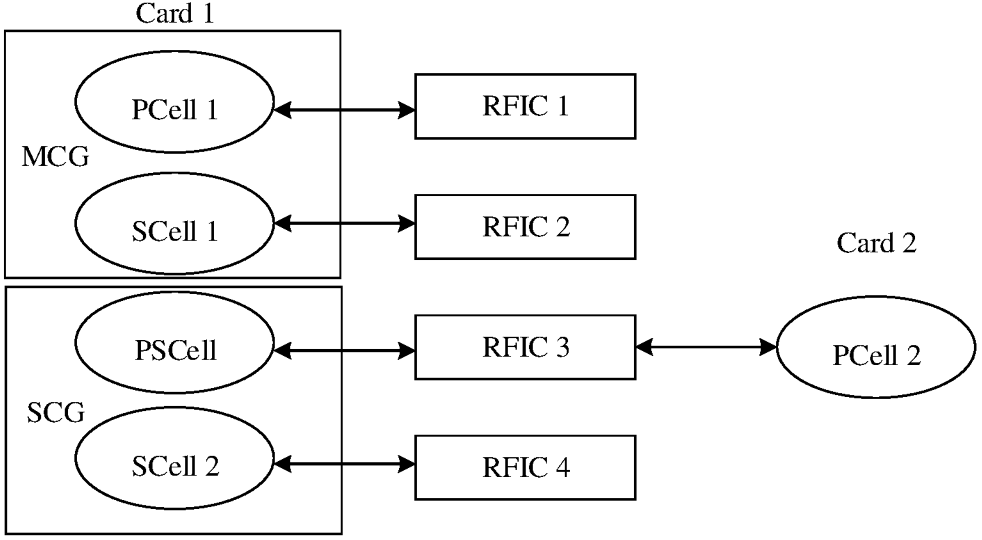
FIG. 8 is a schematic diagram of a resource conflict according to an embodiment of this application.

Similarly, in this embodiment of this application, the terminal device actively requests to suppress activation of the first carrier group or the first cell group, so that the radio frequency conflict (for example, the RFIC channel conflict) problem can be effectively avoided, and the carrier activated by the network device does not exceed the actual hardware capability of the terminal device, thereby ensuring user experience. For example, as shown in FIG. 8, when the first carrier group corresponds to an SCG, or the first cell group is an SCG group, if the terminal device supports dual cards, the terminal device is connected to a first network device in a network of a card 1 in a DC manner, and is connected to a second network device in a network of a card 2 in the DC manner. It is assumed that the terminal device accesses an MCG and the SCG in the network of the card 1. The MCG of the terminal device includes a PCell 1 and an SCell 1. The PCell 1 and the SCell 1 respectively correspond to a PCC and an SCC 1, and respectively occupy an RFIC 1 and an RFIC 2 of the terminal device. The SCG includes a PSCell and an SCell 2. The PSCell and the SCell 2 respectively correspond to an SCC 2 and an SCC 3, and respectively occupy an RFIC 3 and an RFIC 4 of the terminal device. The terminal device accesses a PCell 2 in the network of the card 2, and a PCC corresponding to the PCell 2 occupies the RFIC 3 of the terminal device. The PSCell in the SCG in the network corresponding to the card 1 and the PCell 2 in the network corresponding to the card 2 occupy the same RFIC. Therefore, the terminal device may request to suppress activation of the SCG or a carrier group corresponding to the SCG, to prevent the terminal device from normally communicating with the network on the SCG due to a hardware conflict or the like, so that the network and the terminal device can cooperate better.

In a last aspect, in this embodiment of this application, two steps of controlling, by the terminal device, the quantity of activated carriers as required (the maximum quantity of activated carriers requested by the terminal device) and specific carrier suppression (carrier deactivation requested by the terminal device) are combined, so that the quantity of carriers that can be simultaneously activated on the network side is first limited, to ensure that the carrier activated by the network does not exceed the baseband capability of the terminal device, thereby reducing a probability of occurrence of the hardware conflict to some extent. For example, for the terminal device that supports the dual cards, four CCs are reported in dual-card capability reporting. If the network simultaneously activates four CCs of a primary card and four CCs of a secondary card, both a baseband conflict and a radio frequency conflict exist, and a quantity of conflicting carriers is large. The terminal device needs to dynamically request to deactivate a large quantity of carriers, which greatly increases scheduling complexity on the network side, and is also unfavorable to network load balancing. However, according to the solution in this embodiment of this application, the primary card and the secondary card respectively report that the maximum quantity of activated carriers is four CCs and that the maximum quantity of activated carriers is one CC. In addition, after the response from the network is obtained, it can already be ensured that the quantities of activated carriers on the dual cards do not exceed the baseband capability. However, only in a scenario in which the radio frequency conflict occurs between one CC (which is used as a PCC on the secondary card) of the secondary card and an SCC of the primary card, the terminal device needs to request deactivation of the one CC with a specific conflict. Therefore, after the quantity of carriers that can be activated is limited, the probability of occurrence of the hardware conflict is reduced, and scheduling complexity is reduced for the network.

This embodiment of this application may be further applied to a switching scenario. For example, when the terminal device is switched from a source network device to a target network device, the source network device may send information related to the maximum quantity of activated carriers to the target network device. The information related to the maximum quantity of activated carriers includes at least one of the following: (1) the request message for the maximum quantity of activated carriers that is sent by the terminal device, or some or all content included in the request message for the maximum quantity of activated carriers; (2) a remaining valid time of the maximum quantity of activated carriers that is confirmed by the source network device, where the remaining valid time is a valid time of the maximum quantity of activated carriers that is confirmed by the source network device minus a time at which the maximum quantity of activated carriers takes effect at the source network device; and (3) a time at which the maximum quantity of activated carriers takes effect on a source network device side.

Optionally, during switching, the source network device sends information related to an activation suppression configuration to the target network device. The information related to the activation suppression configuration may include the configuration message sent by the network device in S704, or some or all content included in the configuration message.

Optionally, the information related to the maximum quantity of activated carriers and the information related to the activation suppression configuration are carried in a switching request message, and the switching request message is sent to the target network device.

This embodiment of this application may be further applied to the DC scenario. In the DC scenario, the terminal device sends the second information to an MN, as described in S702, and receives the second response information from the MN, as described in S703. The MN sends the configuration message to the terminal device, as described in S704. The terminal device sends the first information to the MN, as described in S705. The MN sends the first response information to the terminal, as described in S706. The MN sends, to an SN, the information related to the maximum quantity of activated carriers that is determined based on the second information and the information related to the carrier suppression configuration that is determined by the MN in S704. The information related to the maximum quantity of activated carriers includes: a maximum quantity of carriers that can be activated on the SN that is allowed by the MN, where the quantity is less than or equal to the maximum quantity of activated carriers requested by the terminal device; and a valid time and a valid range of the maximum quantity of activated carriers.

Currently, there are mainly two scenarios in which the hardware conflict occurs. The terminal device that supports the dual cards is used as an example: (1) On a card, before the network configures (adds) a frequency as an SCC, a hardware resource associated with the frequency has been occupied by the other card; and (2) on a card, after the network configures (adds) or activates an SCC, a hardware conflict occurs between a hardware resource associated with the SCC and the other card.

In a hardware design, there is a fixed correspondence between a carrier frequency and a radio frequency resource (for example, an RFIC channel). In addition, to reduce hardware costs, each frequency corresponds to only a limited quantity of RFIC channels. For example, for each single band, there are two to three candidate RFIC channels. For a PCC used for CA, there are generally one to two candidate RFIC channels. For an SCC, there is generally only one RFIC channel. The PCC may correspond to a plurality of RFIC channels. Because the candidate RFIC channel exists, availability of the PCC can be ensured to the maximum extent, thereby ensuring that a voice service is not interrupted, and ensuring user experience. However, for a carrier frequency configured as an SCC, when an RFIC channel corresponding to the carrier frequency is occupied, the terminal device cannot normally work on the SCC, and cannot correctly decode data scheduled by the network device on the SCC. However, when the carrier frequency is configured as a PCC, the carrier frequency may correspond to an additional RFIC channel, to ensure that no conflict occurs with an RFIC channel of another carrier frequency. Therefore, the terminal device can normally work on the PCC.

In addition, during RFIC channel allocation, an RFIC channel corresponding to each carrier is determined based on a band combination (band combination, BC). To be specific, for a carrier M in a same band A, when a band combination configured by the network is the band A (including the carrier M), a band B, and a band C, and a band combination configured by the network is the band A (including the carrier M) and the band B: a band M in the band A may correspond to a same RFIC channel or different RFIC channels in the foregoing two different band combinations. Therefore, the terminal device needs to determine, for the BC combination configured by the network device, whether the hardware resource is occupied.

Figures 9, 10:
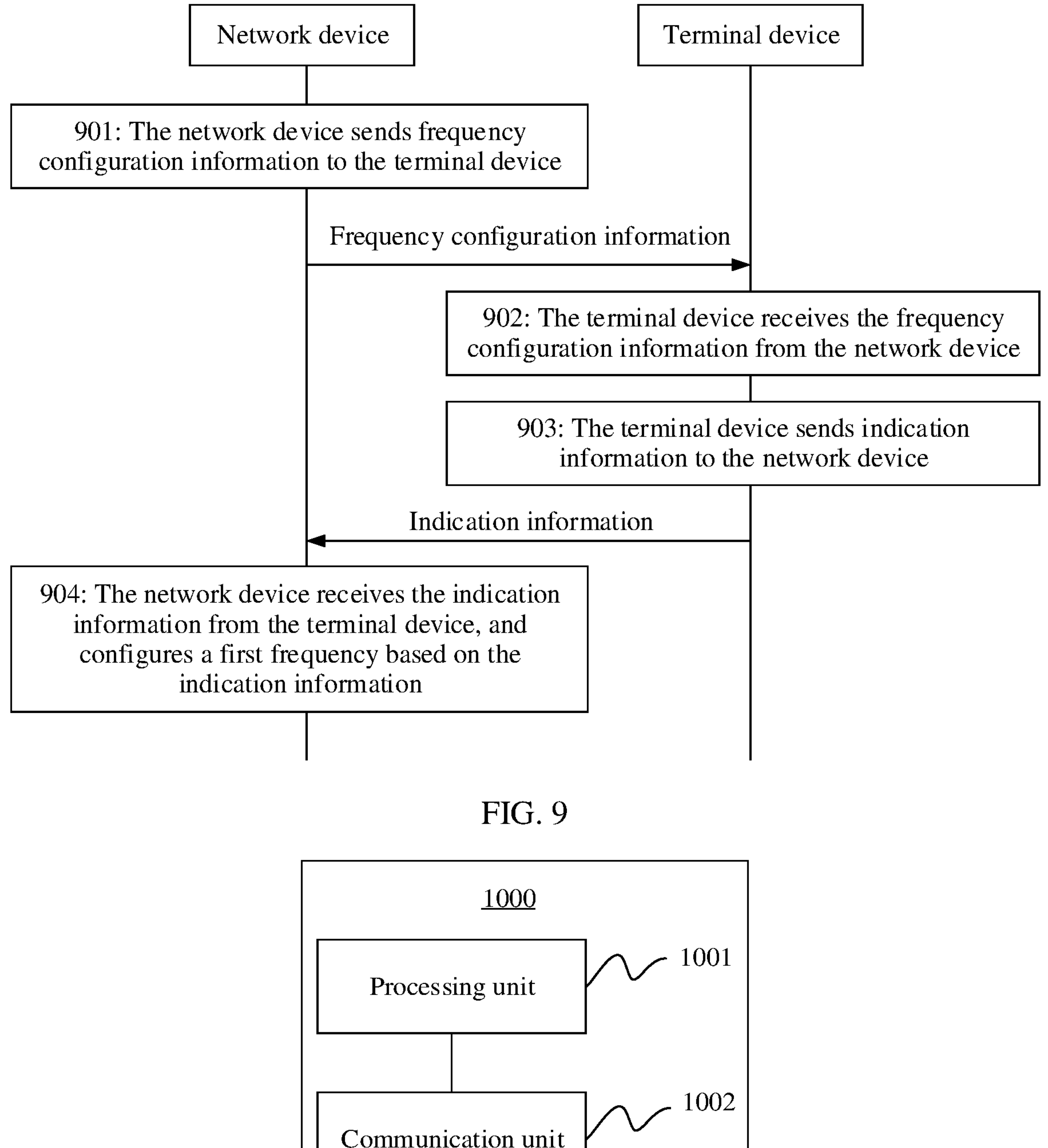
FIG. 9 is a schematic flowchart of a communication method according to an embodiment of this application.
FIG. 10 is a schematic diagram of a structure of a communication apparatus according to an embodiment of this application.

With reference to the foregoing descriptions, FIG. 9 is a schematic flowchart of a communication method according to an embodiment of this application. Refer to FIG. 9. The method includes the following steps.

S901: A network device sends frequency configuration information to a terminal device.

S902: The terminal device receives the frequency configuration information from the network device.

The frequency configuration information is used to configure a first frequency. The frequency configuration information may be further used to configure another frequency, for example, a second frequency. This is not limited in this embodiment of this application.

S903: The terminal device sends indication information to the network device.

The indication information may indicate at least one of the following: skipping configuring the first frequency as an SCC; and skipping activating the SCC configured based on the first frequency, where the first frequency can be configured as only a PCC. In this case, the terminal device can perform radio resource management (RRM) measurement on the first frequency, and report a measurement result. The measurement result is used only for mobility.

In a possible implementation, the terminal device may send the indication information when determining that any one of the following conditions is met:

a hardware resource associated with the first frequency is occupied by the second frequency; a potential conflict occurs between transmission of the first frequency and transmission of the second frequency; the first frequency and the second frequency cannot simultaneously work; and radio frequency interference exists between the first frequency and the second frequency.

For example, the foregoing condition may correspond to the following two scenarios:

Scenario 1: The first frequency is not configured (or added) as the SCC or a PCC, but the hardware resource associated with the first frequency is occupied, for example, occupied by the second frequency. The hardware resource herein may include at least one of a baseband resource and a radio frequency resource.

For example, the terminal device supports dual cards, the first frequency is configured by a network corresponding to a card 1, and the second frequency is configured by a network corresponding to a card 2. Before the first frequency is not configured as the SCC, the second frequency has been configured as a PCC. If a radio frequency channel occupied by the PCC corresponding to the second frequency and a radio frequency channel associated with the SCC corresponding to the first frequency are a same radio frequency channel, on the radio frequency channel, a conflict occurs between the SCC corresponding to the first frequency and the PCC corresponding to the second frequency. Therefore, to ensure normal access of the card 2, the terminal device needs to report, to the network of the card 1, that the SCC corresponding to the first frequency is unavailable. A meaning of unavailability is that it is expected that the network does not add the first frequency to the terminal device as the SCC.

Scenario 2: The first frequency has been configured (or added) as the SCC or the PCC, and a hardware conflict occurs between the hardware resource associated with the SCC and a hardware resource associated with the another frequency.

For example, with reference to the example in the foregoing scenario 1, when the first frequency has been configured as the SCC, the SCC has been configured or activated, the second frequency has been configured as the PCC, and the PCC has been configured or activated, a hardware conflict occurs between the PCC and the SCC.

In this embodiment of this application, the indication information may be valid in a time period. Therefore, the indication information may further indicate the time period in which the indication information is valid. The indication information may directly indicate a valid time, or may not indicate a valid time, but indicate a valid condition. For example, the indication information may further indicate at least one piece of the following information:

- information 1, indicating the valid time of the indication information, where the valid time may indicate a time length, for example, 10 milliseconds, 30 seconds, or 5 minutes;
- information 2, indicating that the indication information is valid in a current RRC connection to the network device. It may also be understood that when second information includes second indication information, in other words, when the terminal device indicates, in the second information, that a maximum quantity of activated carriers is valid in the current RRC connection to the network device, the information 2 is used to confirm the second indication information of the terminal; and
- information 3: indicating that the indication information remains valid before the terminal device sends new indication information.

Optionally, the indication information may further include at least one of the following: a reason or purpose of skipping configuring the first frequency as the SCC; and a reason or purpose of skipping activating the SCC configured based on the first frequency, where the first frequency can be configured as only the PCC.

S904: The network device receives the indication information from the terminal device, and configures the first frequency based on the indication information.

In a possible implementation, the indication information is carried in the measurement report or a carrier deactivation request message.

An advantage of carrying the indication information in the measurement report is as follows: First, before a carrier frequency is configured as an SCC or a PCC, if a hardware resource of the carrier frequency is already occupied, the terminal device may determine, in a current BC combination, a carrier frequency on which a hardware conflict may occur. In addition, the carrier frequency on which the conflict may occur is indicated to the network device in advance, thereby avoiding occurrence of the hardware conflict in advance and ensuring user experience. Second, measurement reporting may be performed to the network purposefully to ensure that mobility measurement is not affected. If the terminal device falsely reports the measurement report, for example, reports signal quality of a poor carrier frequency, mobility measurement of the terminal device is also affected. In other words, the network device mistakenly considers that the carrier frequency cannot be used as a target frequency of a switched-to PCC. As a result, the terminal device cannot be switched to the PCC of the carrier frequency. According to this solution, it can be ensured that the terminal device can normally perform a mobility-based measurement procedure, and mobility experience of the terminal device can be ensured.

According to the foregoing method, a terminal device that supports dual cards is used as an example. On one hand, before the network configures a frequency an SCC, if the other card already occupies a hardware resource (for example, an RFIC channel) of the frequency, the SCC cannot work normally. According to the solution provided in this application, a frequency application limitation indication is reported in the measurement report, so that the network can be prevented from configuring/activating the frequency whose hardware capability has been occupied as an SCC, a conflict can be avoided in advance, and a packet error caused by a hardware conflict can be avoided. On the other hand, considering that during hardware design of the terminal device, to radio frequency reduce costs, the SCC usually associates and reserves only a limited quantity of RFIC channels. In addition, to ensure that a basic service requirement (for example, a voice service) is met, a PCC usually associates and reserves more RFIC channel resources. Therefore, if data cannot be transmitted or received on a frequency due to the hardware conflict, the frequency may be used as a PCC and a target PCC during switching. Therefore, in this application, a frequency application limitation is explicitly reported, to help the network better configure the frequency, thereby ensuring service quality and user experience.

In the foregoing embodiments provided in this application, the methods provided in embodiments of this application are described from a perspective of interaction between devices. To implement functions in the methods provided in the foregoing embodiments of this application, the network device or the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In embodiments of this application, division into modules is an example, and is merely logical function division. In actual implementation, another division manner may be used. In addition, functional modules in embodiments of this application may be integrated into one processor, or may exist alone physically, or two or more modules may be integrated into one module. The integrated module may be implemented in a form of hardware, or may be implemented in a form of a software functional module.

Same as the foregoing concept, as shown in FIG. 10, an embodiment of this application further provides a communication apparatus 1000, configured to implement functions of the network device or the terminal device in the foregoing methods. The communication apparatus 1000 may be the terminal device in FIG. 1, FIG. 2, or FIG. 3, and is configured to implement the method performed by the terminal device in the foregoing method embodiment. Alternatively, the communication apparatus may be the gNB or the ng-eNB in FIG. 1, or the network device in FIG. 2 or FIG. 3, and is configured to implement the method corresponding to the network device in the foregoing method embodiment. For a specific function, refer to the descriptions in the foregoing method embodiment.

Specifically, the communication apparatus 1000 may include a processing unit 1001 and a communication unit 1002. The communication unit may also be referred to as a transceiver unit, and may include a sending unit and/or a receiving unit, which are respectively configured to perform the sending and receiving steps of the network device or the terminal device in the foregoing method embodiments.

Figure 11:
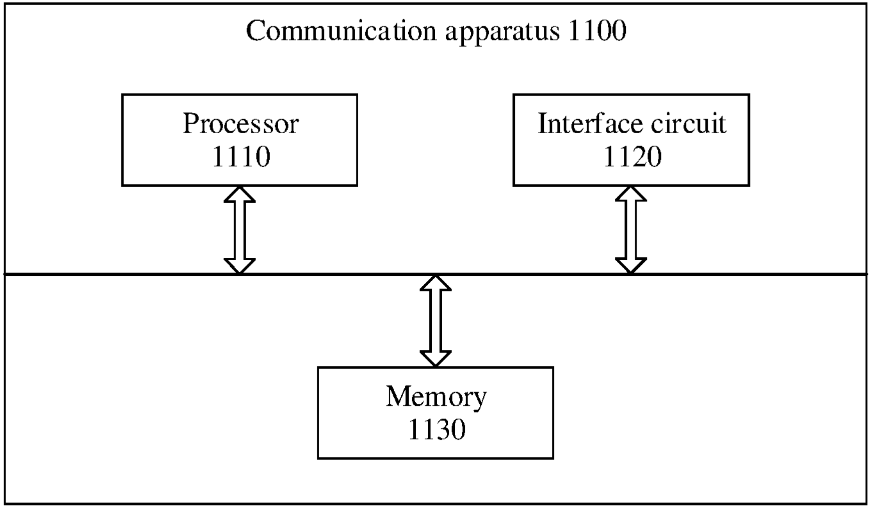
FIG. 11 is a schematic diagram of a structure of a communication apparatus according to an embodiment of this application.

The following describes in detail communication apparatuses provided in embodiments of this application with reference to FIG. 10 and FIG. 11. It should be understood that descriptions of apparatus embodiments correspond to the descriptions of the method embodiments. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. Optionally, a component that is in the communication unit 1002 and that is configured to implement a receiving function may be considered as a receiving unit, and a component that is in the communication unit 1002 and that is configured to implement a sending function may be considered as a sending unit. In other words, the communication unit 1002 includes the receiving unit and the sending unit. The communication unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

In some possible implementations, behavior and functions of the terminal device in the foregoing method embodiments may be implemented by using the communication apparatus 1000, for example, the method performed by the terminal device in the embodiment in FIG. 7 or FIG. 9. For example, the communication apparatus 1000 may be a terminal device, a component (for example, a chip or a circuit) used in the terminal device, a chip or a chip set in the terminal device, or a part that is of a chip and that is configured to perform a related method function. The communication unit 1002 may be configured to perform a receiving or sending operation performed by the terminal device in the embodiment shown in FIG. 7 or FIG. 9. The processing unit 1001 may be configured to perform an operation performed by the terminal device in the embodiment shown in FIG. 7 or FIG. 9 except the sending and receiving operations.

In a possible implementation, the processing unit is configured to receive configuration information from the network device by using the communication unit, where the configuration information is used to configure a first carrier or a first carrier group. The processing unit is configured to send first information to the network device by using the communication unit, where the first information is used to request to suppress activation of the first carrier or the first carrier group.

In a possible implementation, the processing unit is configured to: receive frequency configuration information from the network device by using the communication unit, where the frequency configuration information is used to configure a first frequency; and send indication information to the network device, where the indication information indicates at least one of the following: skipping configuring the first frequency as a secondary component carrier SCC; and skipping activating the SCC configured based on the first frequency, where the first frequency can be configured as only a primary component carrier PCC.

In some possible implementations, behavior and a function of the network device in the foregoing method embodiments may be implemented by using the communication apparatus 1000, for example, the method performed by the network device in the embodiment in FIG. 7 or FIG. 9. For example, the communication apparatus 1000 may be a network device, a component (for example, a chip or a circuit) used in the network device, a chip or a chip set in the network device, or a part that is of a chip and that is configured to perform a related method function. The communication unit 1002 may be configured to perform a receiving or sending operation performed by the network device in the embodiment shown in FIG. 7 or FIG. 9. The processing unit 1001 may be configured to perform an operation performed by the network device in the embodiment shown in FIG. 7 or FIG. 9 except the sending and receiving operations.

In a possible implementation, the processing unit is configured to: send configuration information to the terminal device by using the communication unit, where the configuration information is used to configure a first carrier or a first carrier group; and receive first information from the terminal device, where the first information is used to request to suppress activation of the first carrier or the first carrier group.

In a possible implementation, the processing unit is configured to: send frequency configuration information to the terminal device by using the communication unit, where the frequency configuration information is used to configure a first frequency; and receive indication information from the terminal device, where the indication information indicates at least one of the following: skipping configuring the first frequency as a secondary component carrier SCC; and skipping activating the SCC configured based on the first frequency, where the first frequency can be configured as only a primary component carrier PCC.

The foregoing is merely an example. The processing unit 1001 and the communication unit 1002 may further perform other functions. For more detailed descriptions, refer to related descriptions in the method embodiments shown in FIG. 7 to FIG. 9. Details are not described herein again.

FIG. 11 shows a communication apparatus 1100 according to an embodiment of this application. The apparatus shown in FIG. 11 may be an implementation of a hardware circuit of the apparatus shown in FIG. 10. The communication apparatus is applicable to the foregoing flowchart, and performs the functions of the terminal device or the network device in the foregoing method embodiments. For ease of description, FIG. 11 shows only main components of the communication apparatus.

As shown in FIG. 11, the communication apparatus 1100 includes a processor 1110 and an interface circuit 1120. The processor 1110 and the interface circuit 1120 are coupled to each other. It may be understood that the interface circuit 1120 may be a transceiver or an input/output interface. Optionally, the communication apparatus 1100 may further include a memory 1130, configured to store instructions executed by the processor 1110, store input data required by the processor 1110 to run the instructions, or store data generated after the processor 1110 runs the instructions.

When the communication apparatus 1100 is configured to implement the methods shown in FIG. 7 to FIG. 9, the processor 1110 is configured to implement a function of the processing unit 1001, and the interface circuit 1120 is configured to implement a function of the communication unit 1002.

When the communication apparatus is a chip used in a terminal device, the chip in the terminal device implements the functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements the functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in this embodiment of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any regular processor or the like.

In this embodiment of this application, the memory may be a random access memory (RAM), a flash memory, a read-only memory (ROM), a programmable read-only memory (PROM), an erasable programmable read-only memory (Erasable PROM, EPROM), an electrically erasable programmable read-only memory (Electrically EPROM, EEPROM), a register, a hard disk, a removable hard disk, a CD-ROM, or a storage medium in any other form well-known in the art. For example, the storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in the network device or the terminal device. Certainly, the processor and the storage medium may alternatively exist as discrete components in the network device or the terminal device.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements the specific function in the one or more processes in the flowcharts and/or in the one or more blocks in the block diagrams.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, applied to a terminal device or a chip in the terminal device, the method comprising:

receiving configuration information from a network device, wherein the configuration information configures a first carrier or a first carrier group;

sending first information to the network device, wherein the first information requests to suppress activation of the first carrier or the first carrier group; and performing the following:

suppressing activation of the first carrier or the first carrier group when first response information from the network device is received; or suppressing activation of the first carrier or the first carrier group when first response information from the network device is not received within a first duration after the first information is sent; and wherein when the first response information is received, the first response information further indicates at least one of the following:

a valid time for suppressing activation of the first carrier or the first carrier group; or a state in which activation of the first carrier or the first carrier group is suppressed is valid in a current radio resource control connection to the network device.

2. The method according to claim 1, wherein the first information requesting to suppress the activation of the first carrier or the first carrier group comprises:

when the first carrier or the first carrier group is activated, the first information requests to deactivate the first carrier or the first carrier group; or when the first carrier or the first carrier group is deactivated, the first information requests to keep a deactivated state of the first carrier or the first carrier group or requests not to activate the first carrier or the first carrier group.

3. The method according to claim 1, wherein suppressing activation of the first carrier or the first carrier group when first response information from the network device is not received within the first duration after the first information is sent comprises:

starting a timer when the first information is sent, wherein a timing duration of the timer is the first duration;

stopping the timer when the first response information from the network device is received; and when the timer expires, suppressing activation of the first carrier or the first carrier group when the first response information is not received.

4. The method according to claim 1, further comprising:

sending second information to the network device, wherein the second information indicates a maximum quantity of activated carriers expected by the terminal device, and the maximum quantity of activated carriers is less than or equal to a quantity of configured carriers supported by the terminal device.

5. The method according to claim 4, wherein the second information further comprises at least one of the following:

first indication information, wherein the first indication information indicates a valid time of the maximum quantity of activated carriers;

second indication information, wherein the second indication information indicates that the maximum quantity of activated carriers is valid in the current radio resource control connection to the network device; or third indication information, wherein the third indication information indicates that the maximum quantity of activated carriers remains valid before the terminal device requests a new maximum quantity of activated carriers.

6. The method according to claim 4, further comprising:

receiving second response information from the network device, wherein the second response information responds to the second information.

7. The method according to claim 1, wherein before sending the first information to the network device, the method further comprises:

receiving a configuration message from the network device, wherein the configuration message indicates at least one of the following:

allowing the terminal device to request to suppress activation of a quantity of carriers;

allowing the terminal device to request to suppress activation of a carrier;

allowing or disallowing the terminal device to request to suppress activation of a carrier group; or allowing or disallowing the terminal device to request to suppress activation of the carrier.

8. The method according to claim 1, wherein the first information requesting to suppress activation of the first carrier or the first carrier group comprises:

the first information requesting to suppress activation of a downlink direction of the first carrier or the first carrier group, or the first information requesting to suppress activation of an uplink direction of the first carrier or the first carrier group.

9. An apparatus, wherein the apparatus is a terminal device or a chip in the terminal device, and the apparatus comprises:

at least one processor; and a non-transitory computer readable storage medium storing a program that is executable by the at least one processor, the program including instructions for:

receiving frequency configuration information from a network device, wherein the frequency configuration information configures a first frequency; and in response to determining that a hardware resource associated with the first frequency is occupied by a second frequency, sending indication information to the network device, wherein the indication information indicates at least one of the following:

skipping configuring the first frequency as a secondary carrier component (SCC); or skipping activating the SCC configured based on the first frequency, wherein the first frequency is allowed to be configured as only a primary carrier component (PCC).

10. The apparatus according to claim 9, wherein the indication information further indicates a valid time of the indication information.

11. The apparatus according to claim 9, wherein the indication information further indicates that the indication information is valid in a current radio resource control connection to the network device.

12. The apparatus according to claim 9, wherein the indication information further indicates that the indication information remains valid before the terminal device sends new indication information.

13. The apparatus according to claim 9, wherein the indication information further indicates a reason of skipping configuring the first frequency as the SCC, or a reason of skipping activating the SCC configured based on the first frequency.

14. An apparatus, wherein the apparatus is a terminal device or a chip in the terminal device, and the apparatus comprises:

at least one processor; and a non-transitory computer readable storage medium storing a program that is executable by the at least one processor, the program including instructions for:

receiving configuration information from a network device, wherein the configuration information configures a first carrier or a first carrier group; and sending first information to the network device, wherein the first information requests to suppress activation of the first carrier or the first carrier group; and performing the following:

suppressing activation of the first carrier or the first carrier group when first response information from the network device is received; or suppressing activation of the first carrier or the first carrier group when first response information from the network device is not received within a first duration after the first information is sent; and wherein when the first response information is received, the first response information further indicates at least one of the following:

a valid time for suppressing activation of the first carrier or the first carrier group; or a state in which activation of the first carrier or the first carrier group is suppressed is valid in a current radio resource control connection to the network device.

15. The apparatus according to claim 14, wherein the first information requesting to suppress the activation of the first carrier or the first carrier group comprises:

when the first carrier or the first carrier group is activated, the first information requests to deactivate the first carrier or the first carrier group; or when the first carrier or the first carrier group is deactivated, the first information requests to keep a deactivated state of the first carrier or the first carrier group or requests not to activate the first carrier or the first carrier group.

16. The apparatus according to claim 14, wherein suppressing activation of the first carrier or the first carrier group when first response information from the network device is not received within the first duration after the first information is sent comprises:

starting a timer when the first information is sent, wherein a timing duration of the timer is the first duration;

stopping the timer when the first response information from the network device is received; and when the timer expires, suppressing activation of the first carrier or the first carrier group when the first response information is not received.

17. The apparatus according to claim 14, wherein the program further includes instructions for:

sending second information to the network device, wherein the second information indicates a maximum quantity of activated carriers expected by the terminal device, and the maximum quantity of activated carriers is less than or equal to a quantity of configured carriers supported by the terminal device.

18. The apparatus according to claim 17, wherein the second information further comprises at least one of the following:

first indication information, wherein the first indication information indicates a valid time of the maximum quantity of activated carriers;

second indication information, wherein the second indication information indicates that the maximum quantity of activated carriers is valid in the current radio resource control connection to the network device; or third indication information, wherein the third indication information indicates that the maximum quantity of activated carriers remains valid before the terminal device requests a new maximum quantity of activated carriers.

19. The apparatus according to claim 17, wherein the program further includes instructions for:

receiving second response information from the network device, wherein the second response information responds to the second information.

20. The apparatus according to claim 14, wherein the program further includes instructions for:

receiving a configuration message from the network device, wherein the configuration message indicates at least one of the following:

allowing the terminal device to request to suppress activation of a quantity of carriers;

allowing the terminal device to request to suppress activation of a carrier;

allowing or disallowing the terminal device to request to suppress activation of a carrier group; or allowing or disallowing the terminal device to request to suppress activation of the carrier.

* * * * *